United States Patent
Brüne

(10) Patent No.: US 8,597,850 B2
(45) Date of Patent: Dec. 3, 2013

(54) FUEL CELL WITHOUT BIPOLAR PLATES

(75) Inventor: Bernhard Brüne, Wiehl (DE)

(73) Assignee: Tedatex Industrie GmbH Beratung-Planung-Entwicklung, Wiehl (DE)

(*) Notice: Subject to any disclaimer, the term of this patent is extended or adjusted under 35 U.S.C. 154(b) by 82 days.

(21) Appl. No.: 13/129,168

(22) PCT Filed: Nov. 12, 2009

(86) PCT No.: PCT/DE2009/001614
§ 371 (c)(1),
(2), (4) Date: May 13, 2011

(87) PCT Pub. No.: WO2010/054647
PCT Pub. Date: May 20, 2010

(65) Prior Publication Data
US 2011/0223512 A1    Sep. 15, 2011

(30) Foreign Application Priority Data

Nov. 13, 2008  (DE) .................. 10 2008 057 253
Apr. 2, 2009    (DE) .................. 10 2009 015 619

(51) Int. Cl.
*H01M 8/04*    (2006.01)
(52) U.S. Cl.
USPC ....................................................... 429/452
(58) Field of Classification Search
None
See application file for complete search history.

(56) References Cited

U.S. PATENT DOCUMENTS

| | | | |
|---|---|---|---|
| 6,194,095 B1 | 2/2001 | Hockaday | |
| 7,678,490 B2 * | 3/2010 | Takeguchi et al. | 429/492 |
| 2005/0175870 A1 * | 8/2005 | Hagan et al. | 429/20 |
| 2008/0193815 A1 * | 8/2008 | Burger et al. | 429/26 |

FOREIGN PATENT DOCUMENTS

| | | |
|---|---|---|
| DE | 1272679 | 5/1963 |
| EP | 0490808 A1 | 11/1991 |
| EP | 1429406 A1 | 11/2002 |

* cited by examiner

*Primary Examiner* — Patrick Ryan
*Assistant Examiner* — Wyatt McConnell
(74) *Attorney, Agent, or Firm* — James Creighton Wray

(57) ABSTRACT

The invention relates to a fuel cell or fuel cell module (12) consisting of a plurality of single cells (7), all of which have the same dimensions, i.e. in terms of the length, width and height. Said cells have an optimal constructions, as the supply lines are associated with and connected to a cooling and medium module (40). Said cooling and medium module (40) is only used to provide secondary functional chambers (41), (42) or functional planes and to form the stack. In addition, either the hydrogen electrode (5), (5') or the oxygen electrode (6), (6') of the neighbouring single cell (7) is situated on both sides of a respective cooling and medium module (40). This obviates the need for all types of bipolar plates, permitting for example thin metal sheets (90), (91) to be used. Said sheets have gas inlets (73) and gas outlets (74) for the oxygen feed (70) and the hydrogen feed (71), allowing the separate conduction of both the process gases and the coolant. In addition, the current feeds to the electrodes (6), (7) are situated and designed in such a way that they allow e.g. connectors (80) to be provided on the outer wall (48), thus permitting both a parallel connection and a series connection.

27 Claims, 22 Drawing Sheets

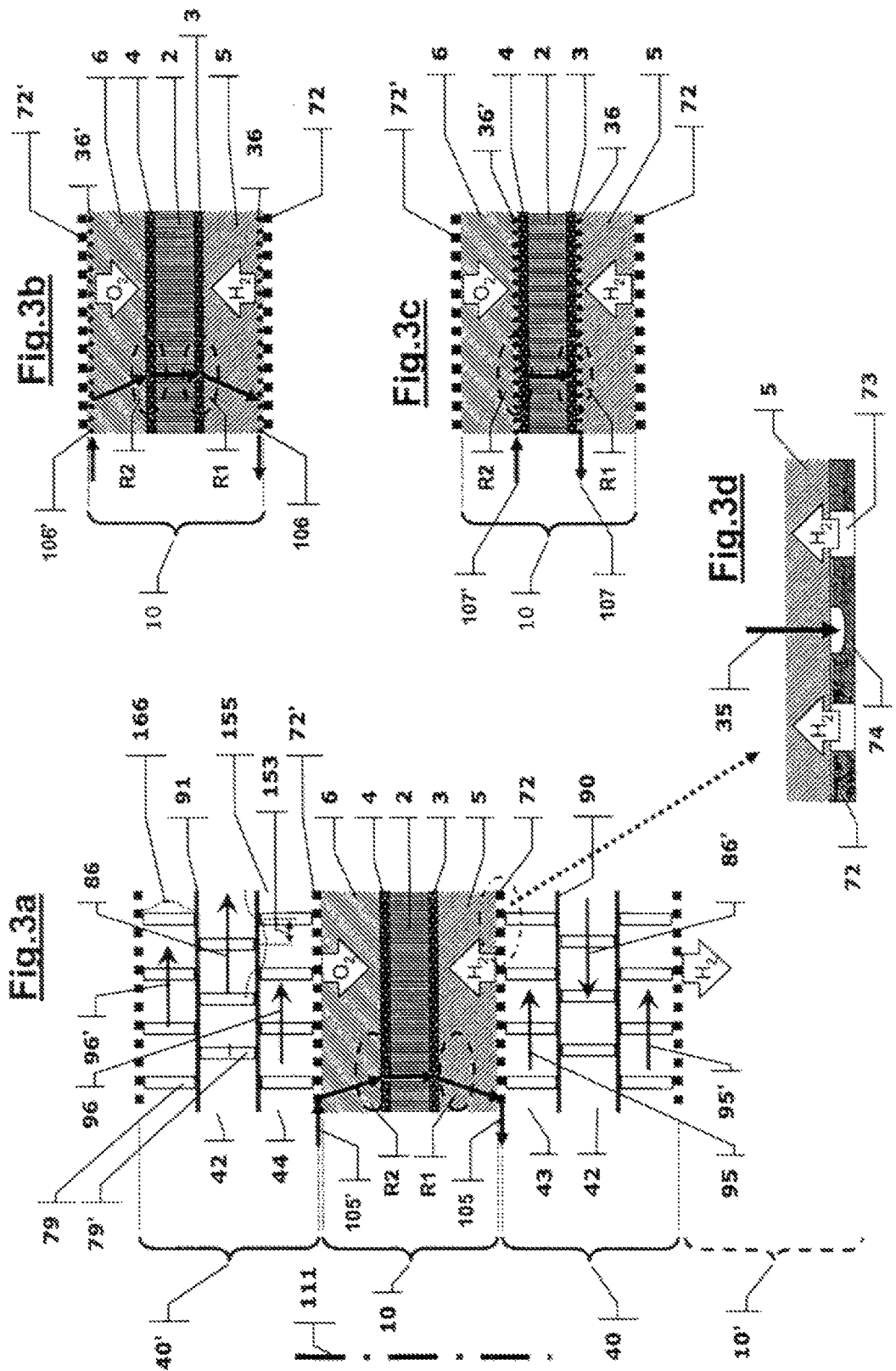

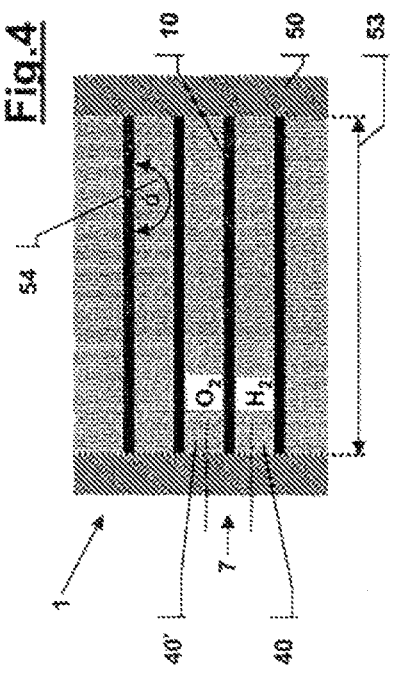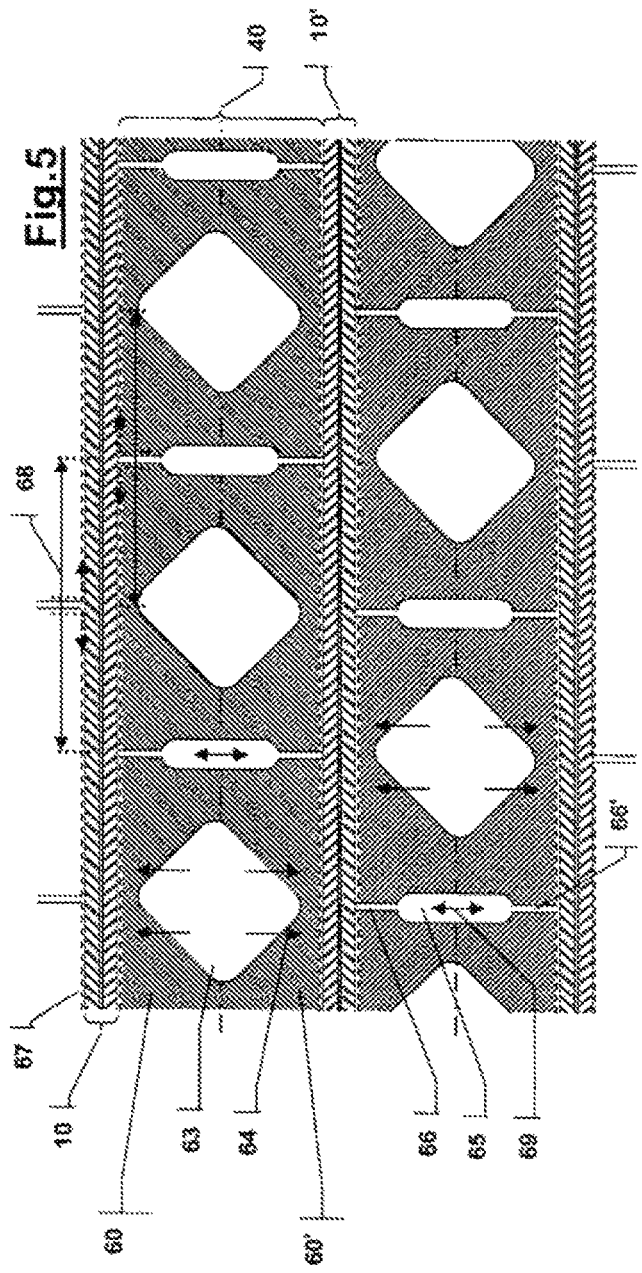

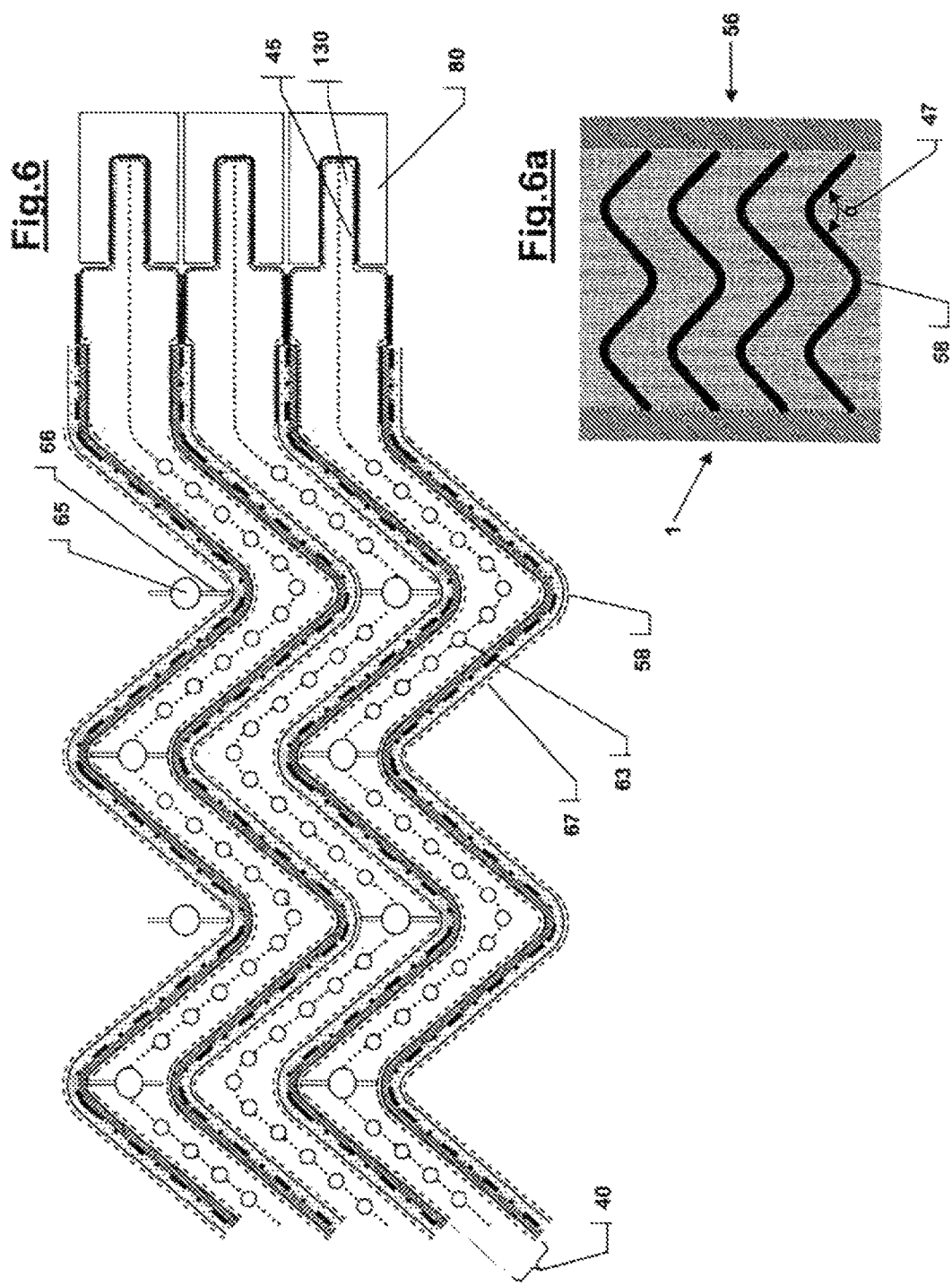

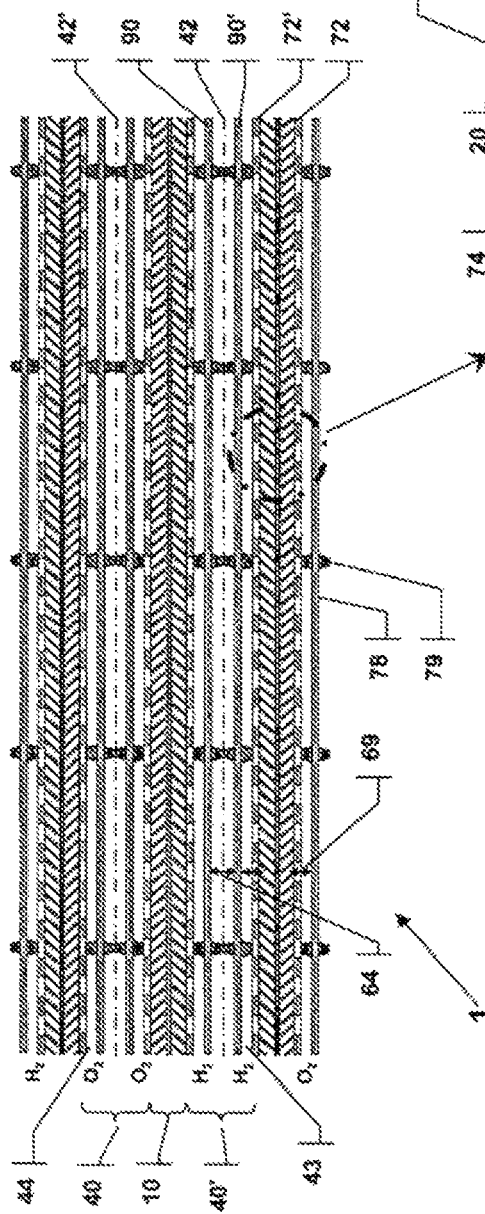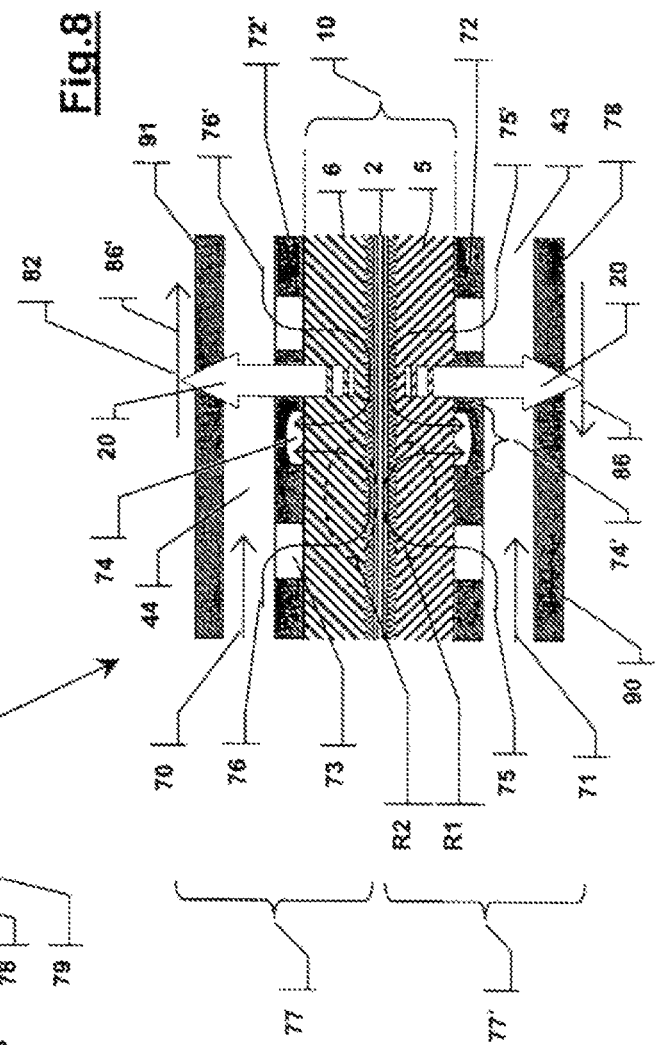

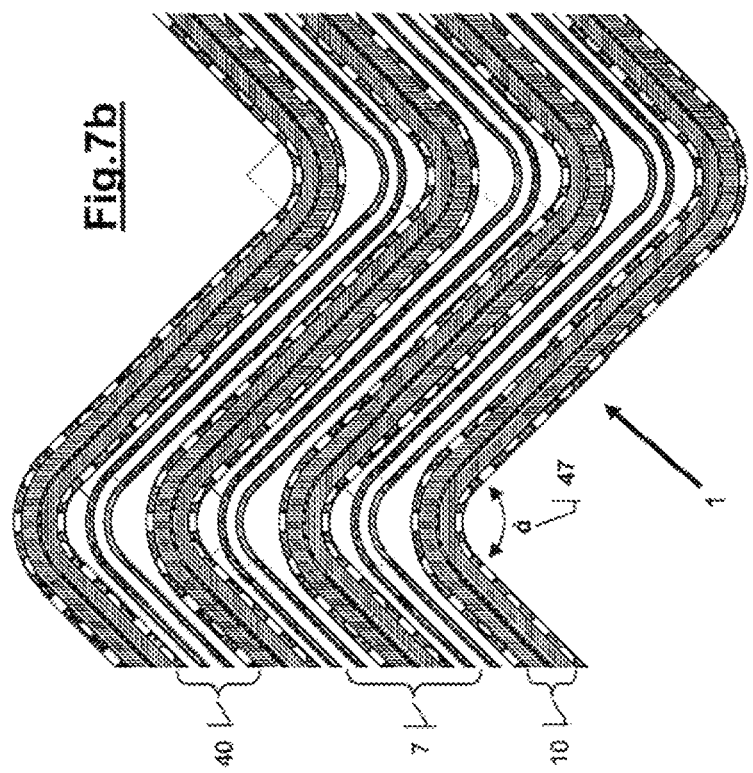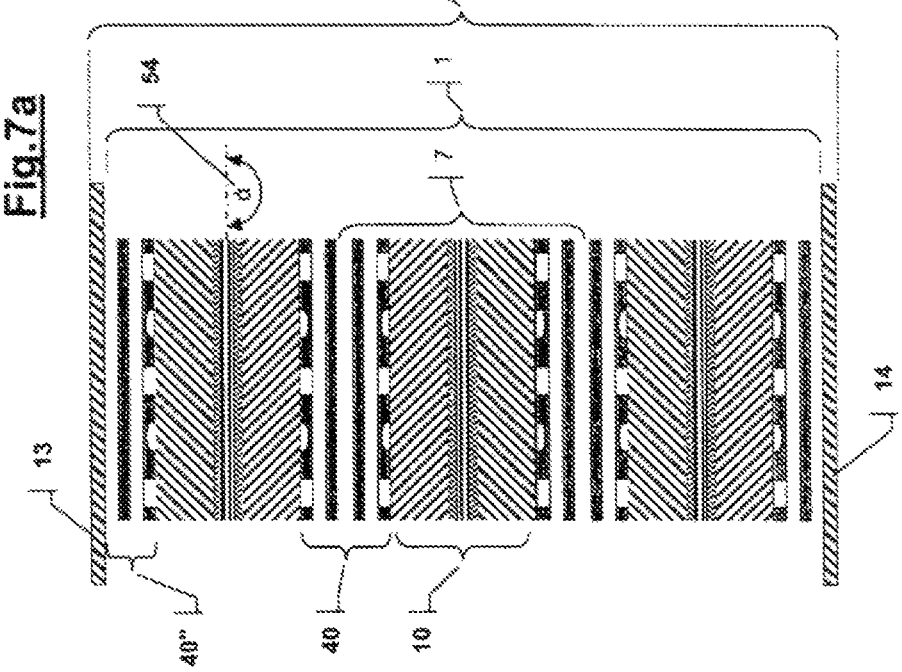

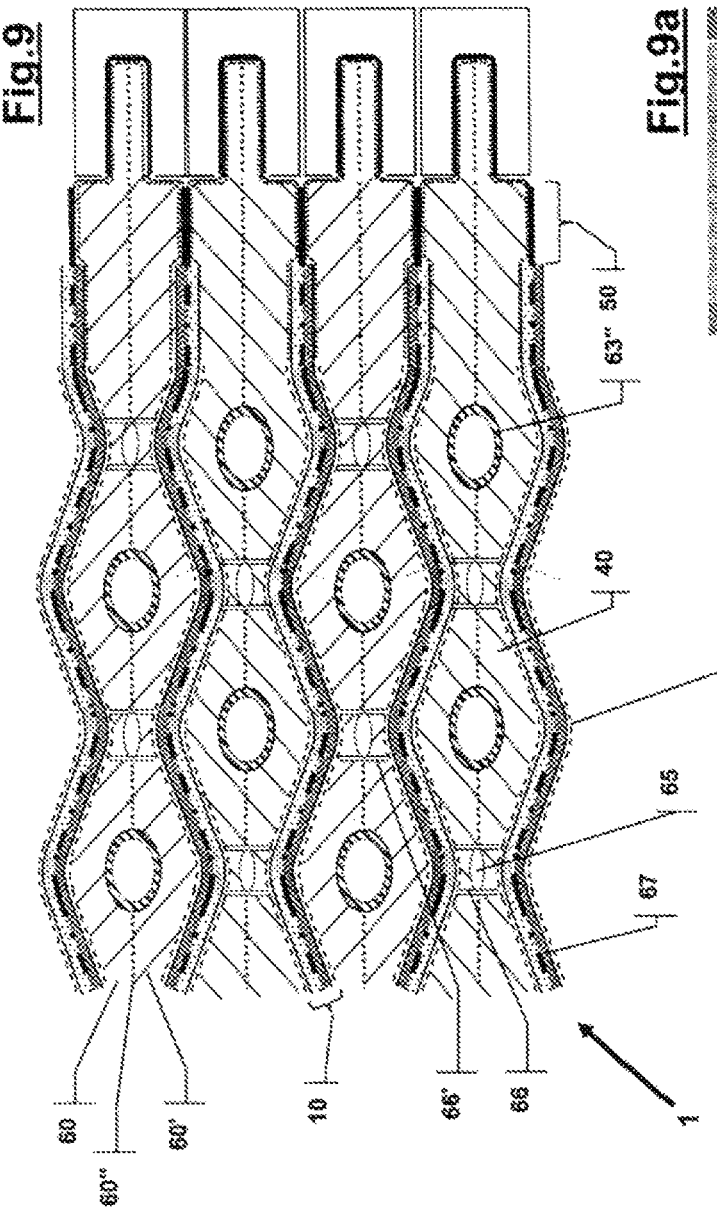
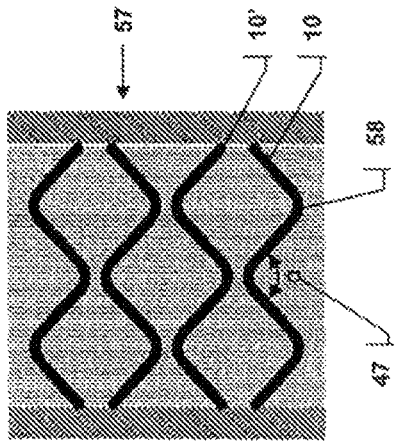

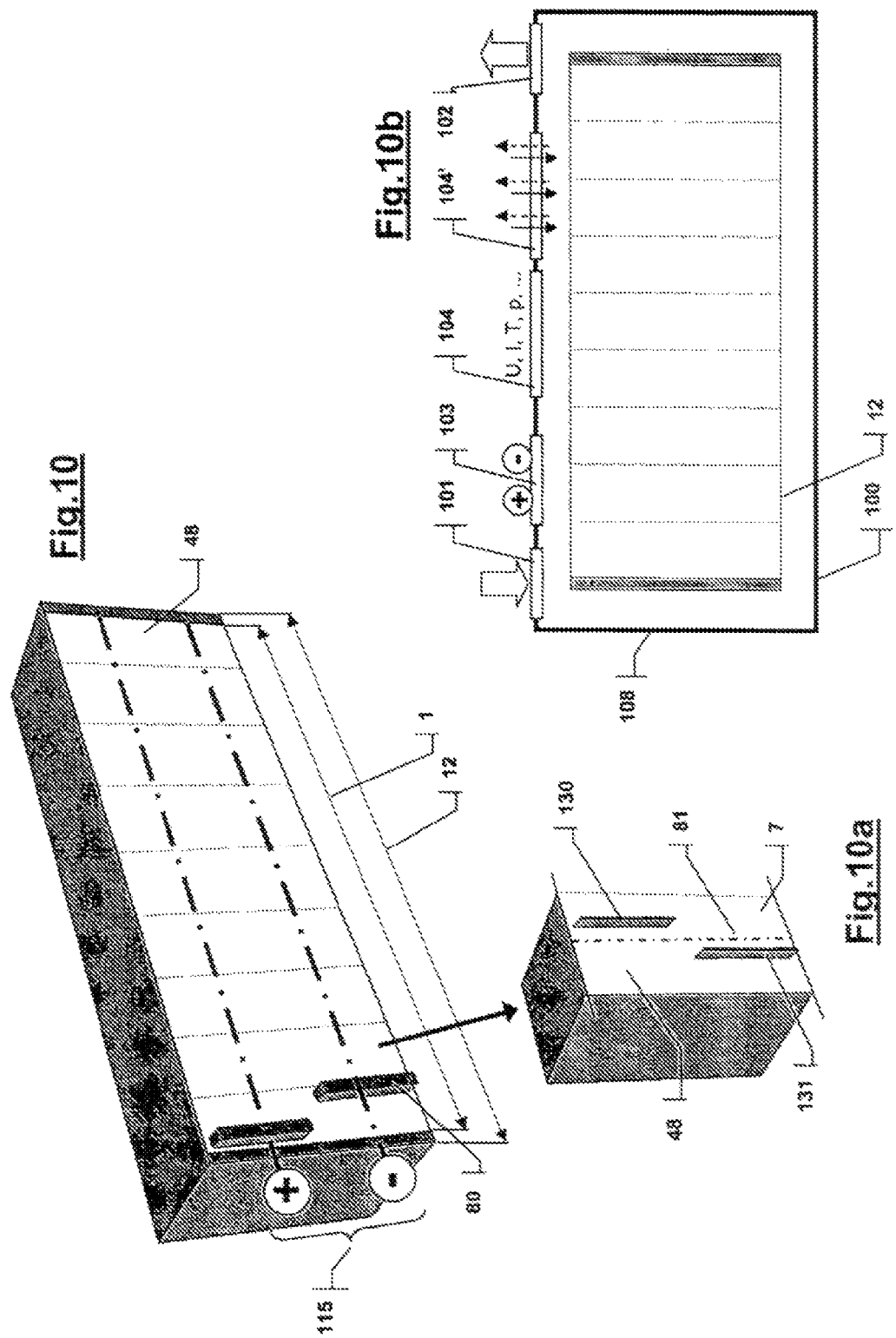

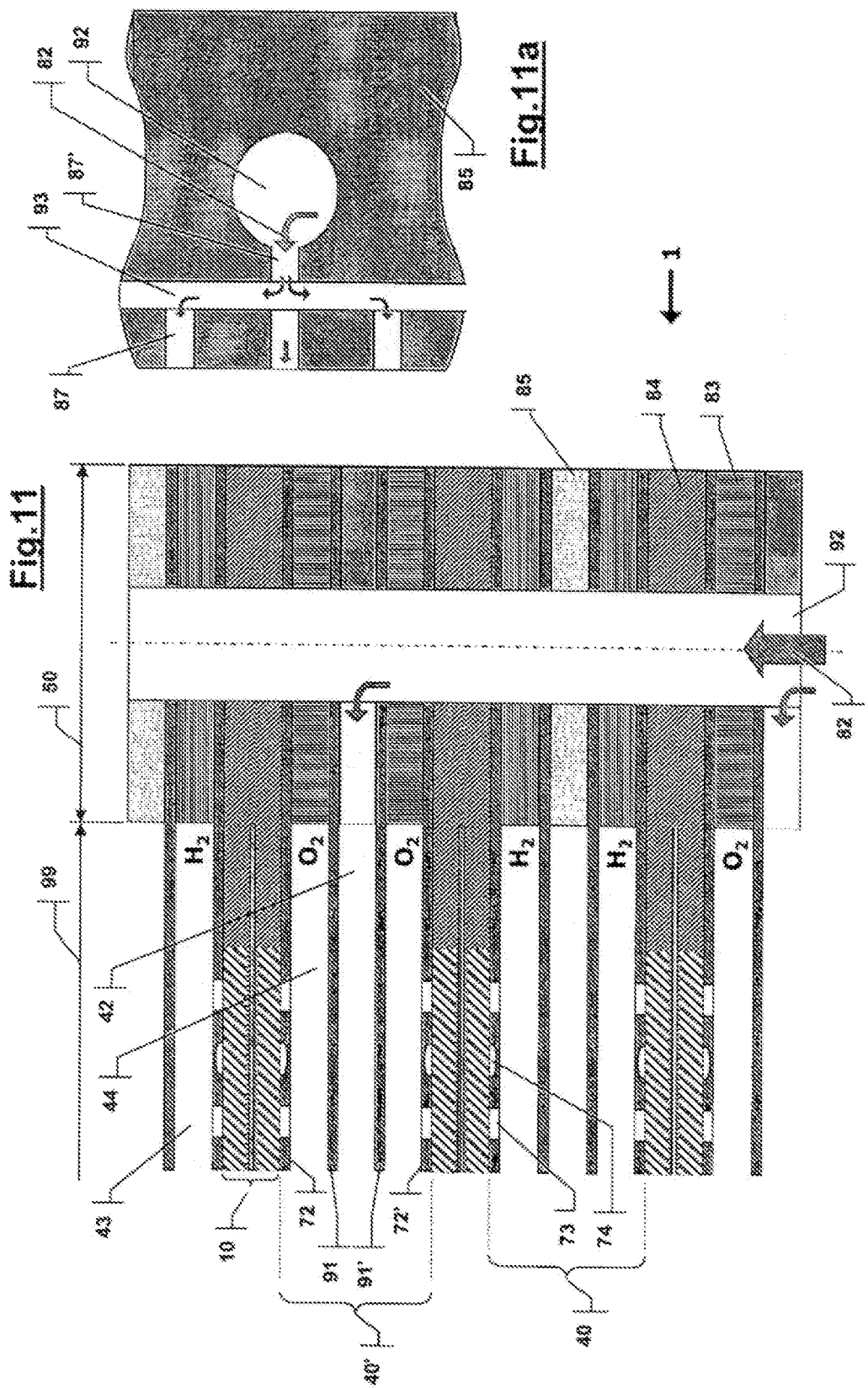

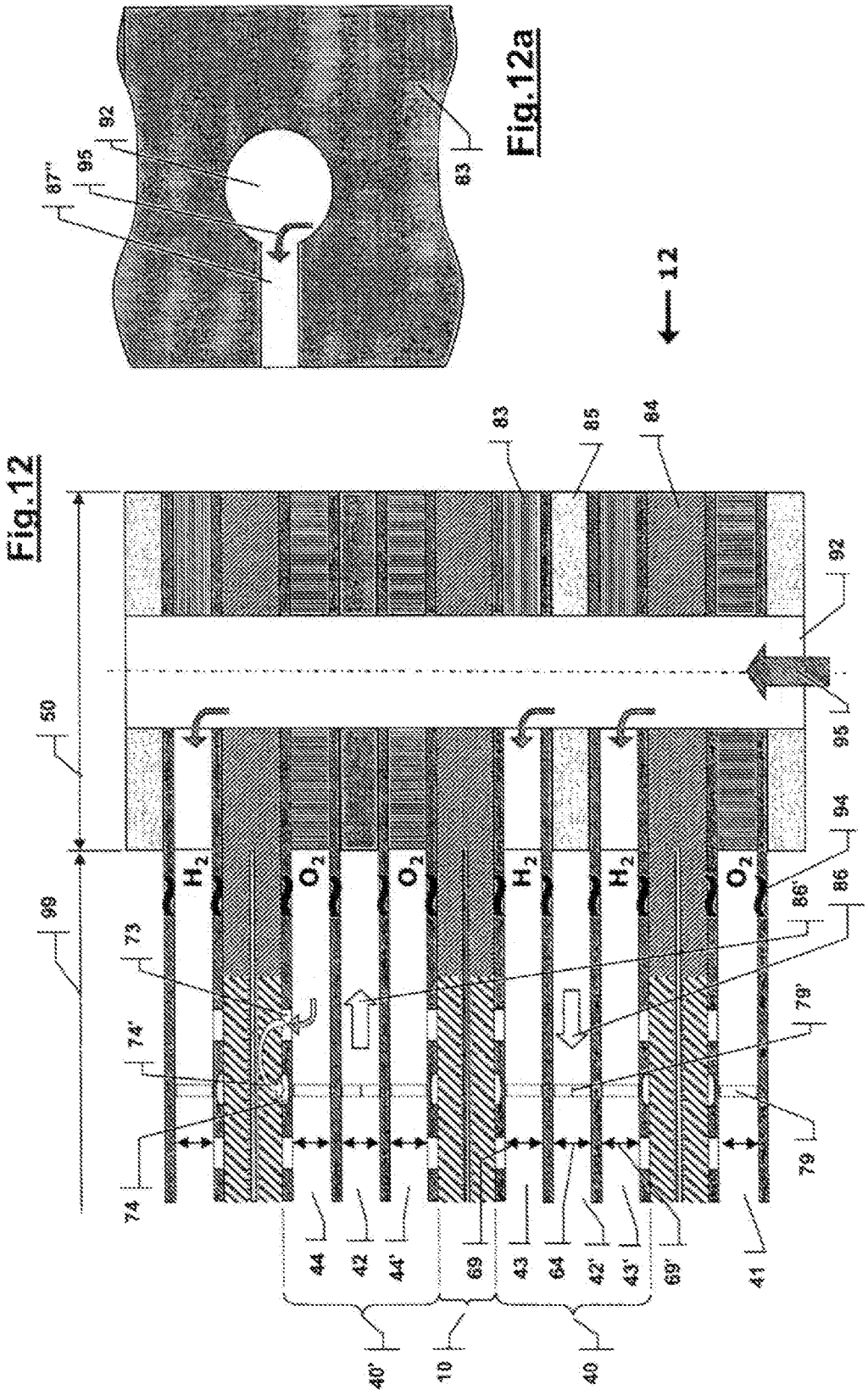

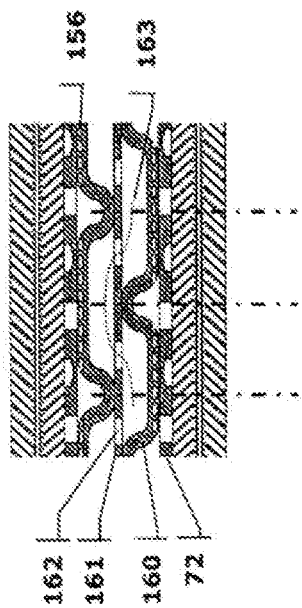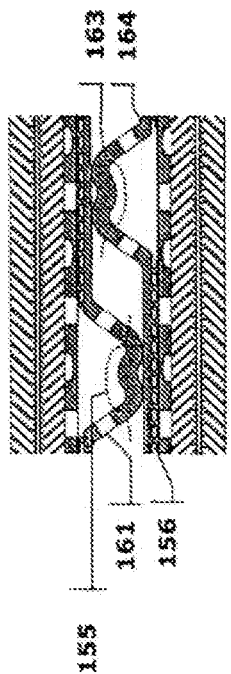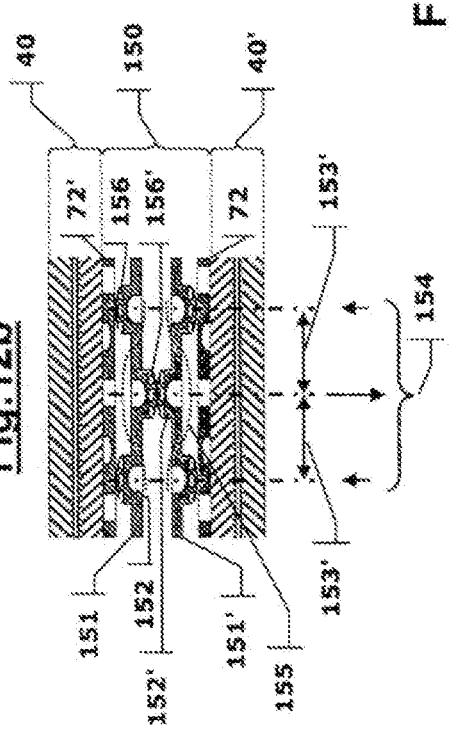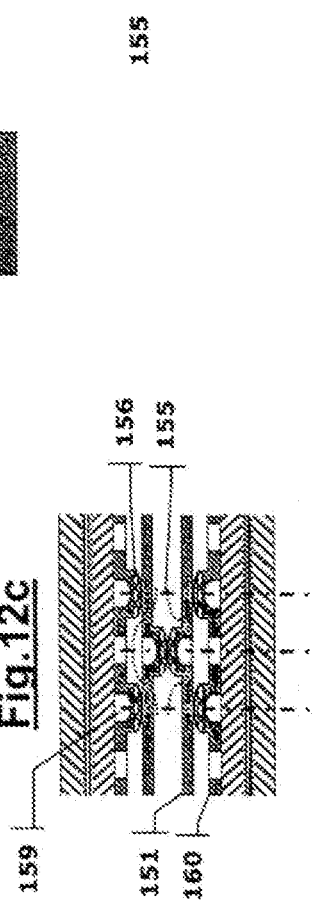

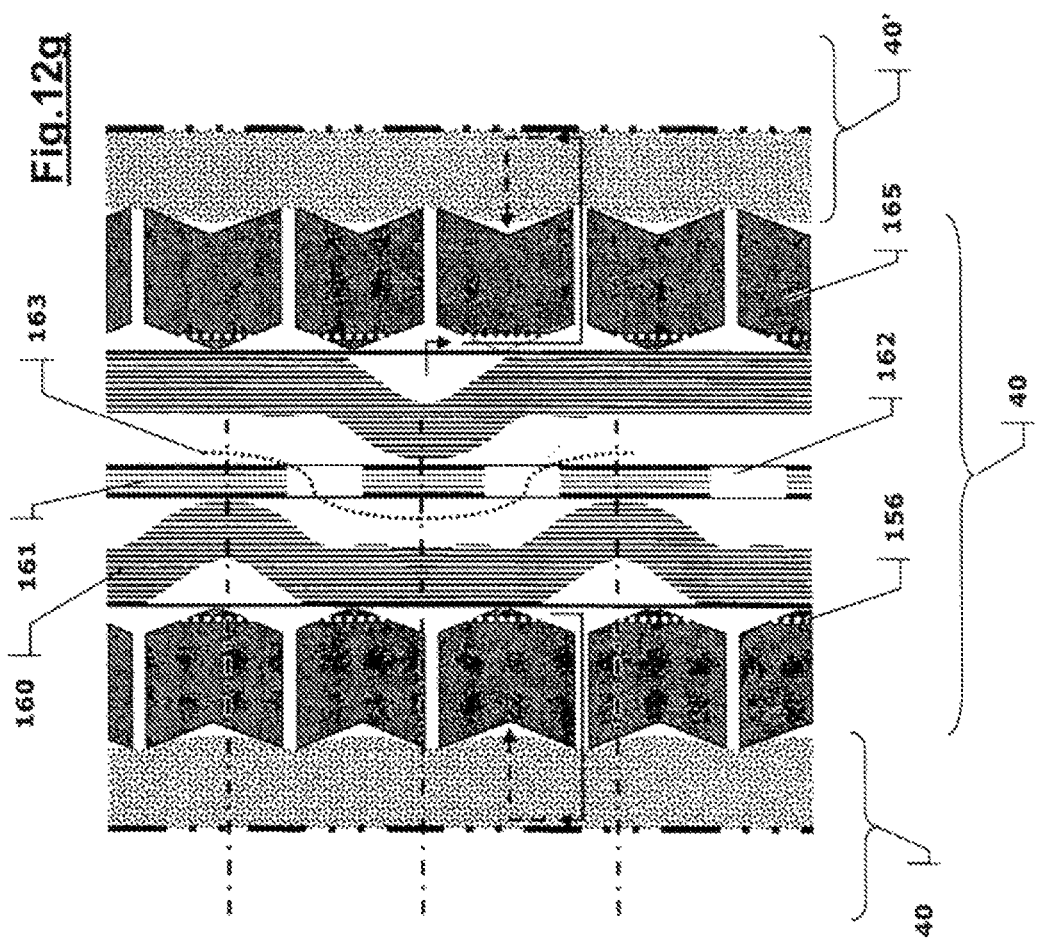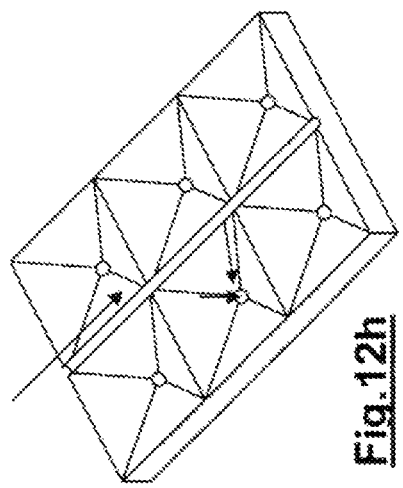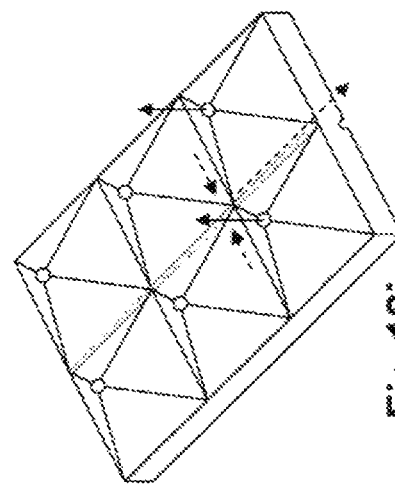

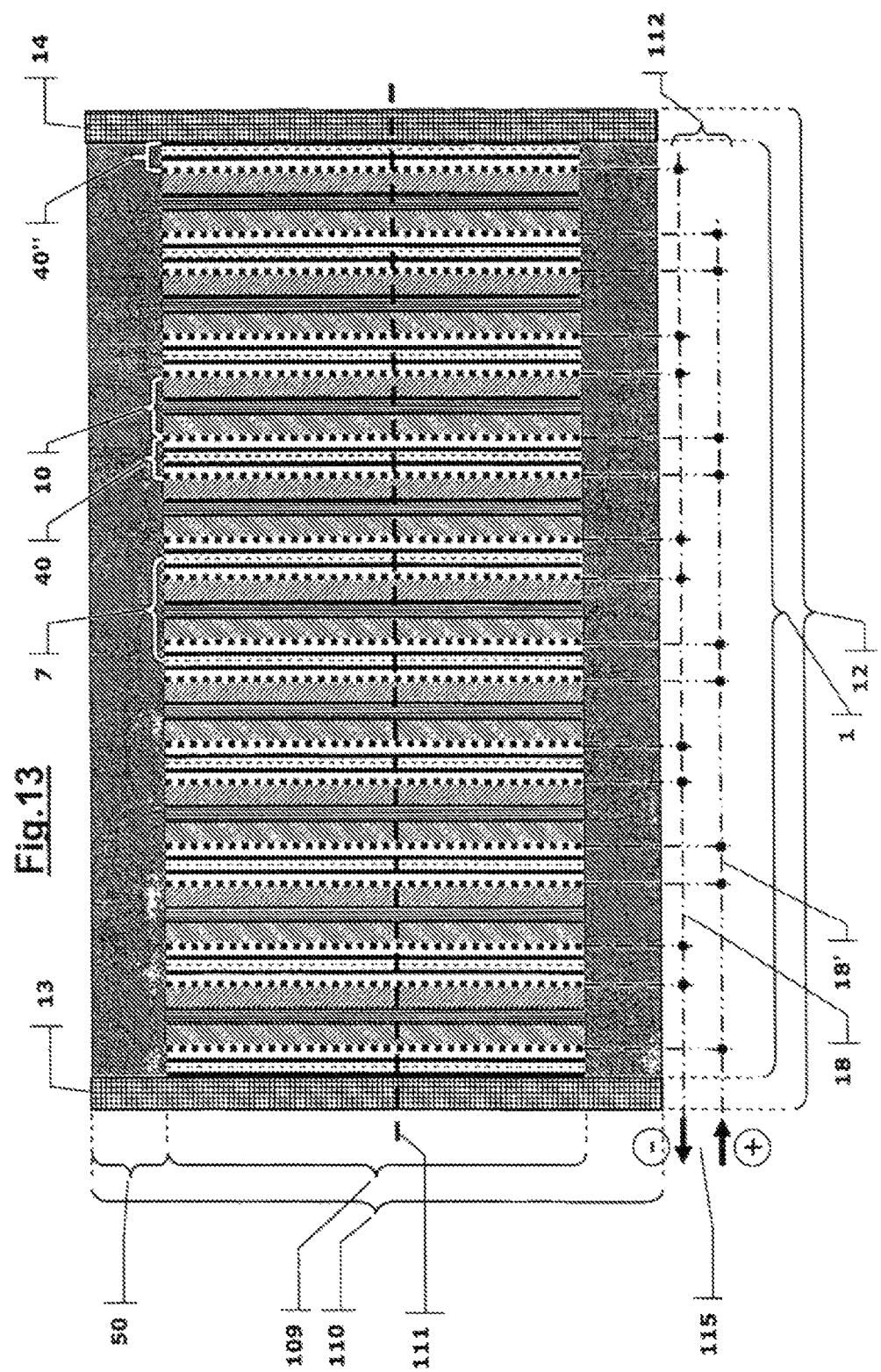

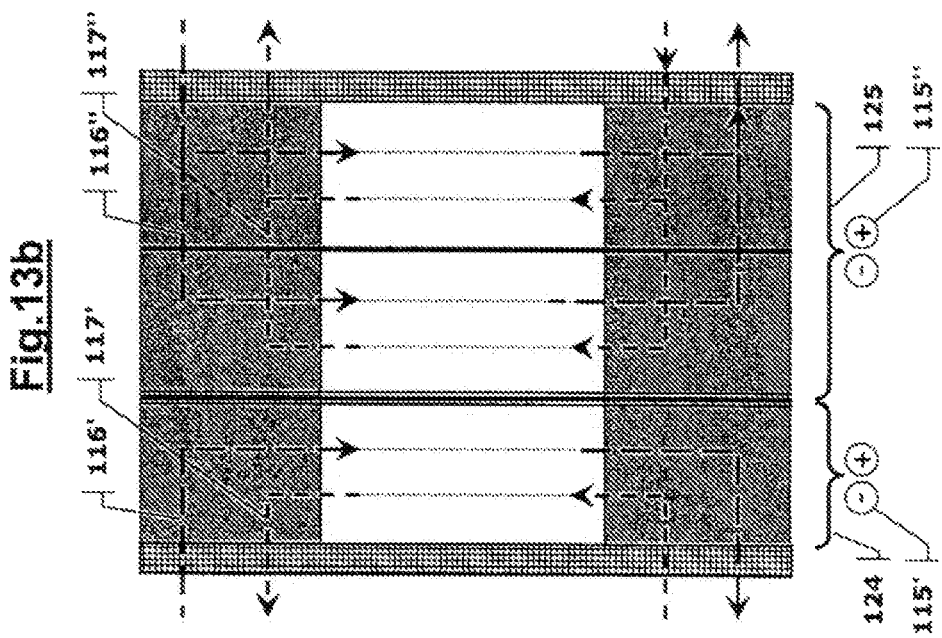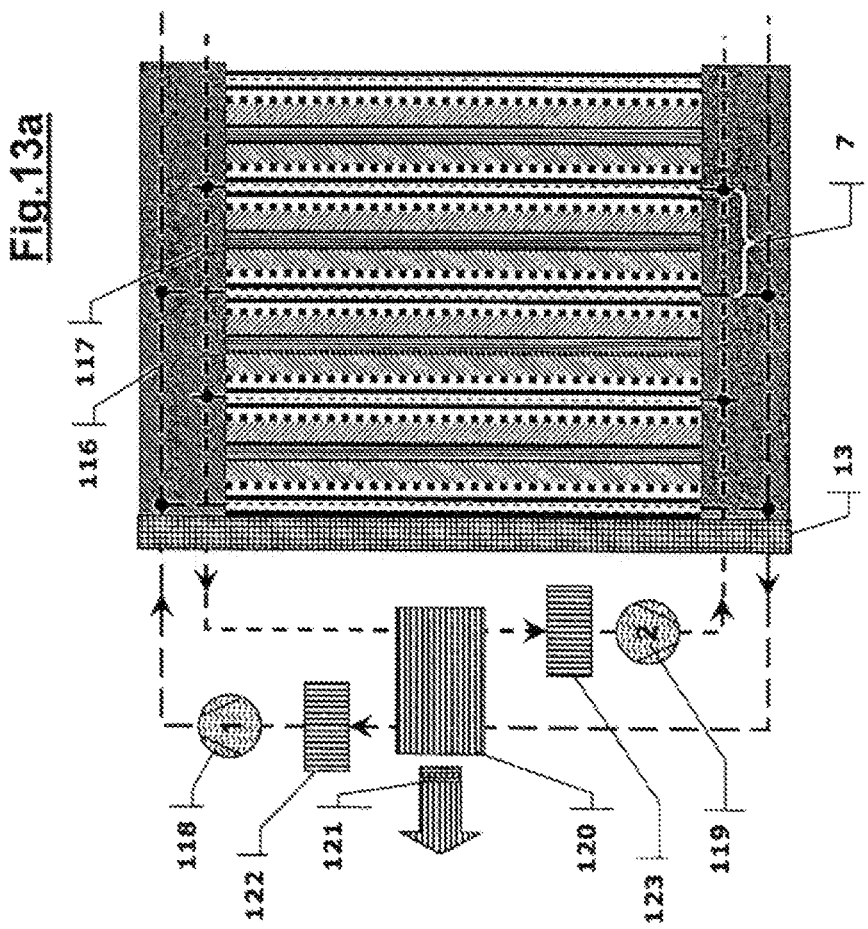

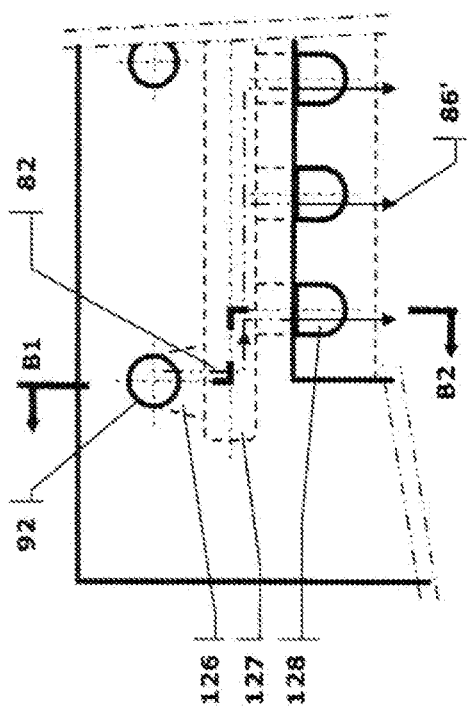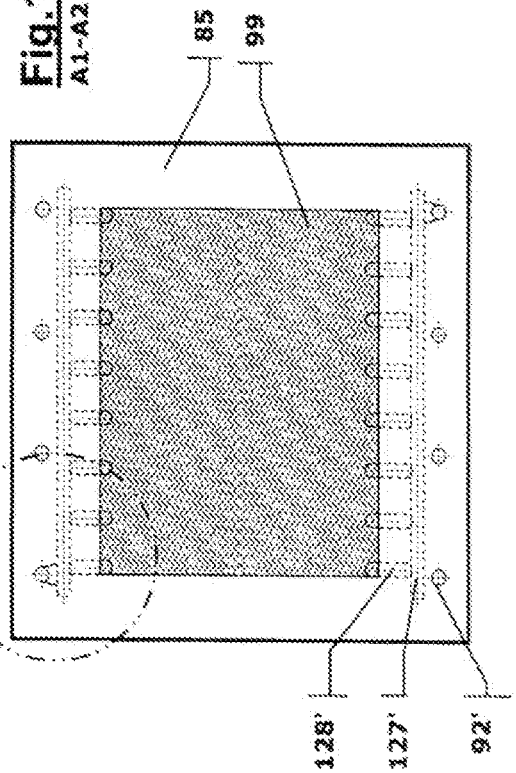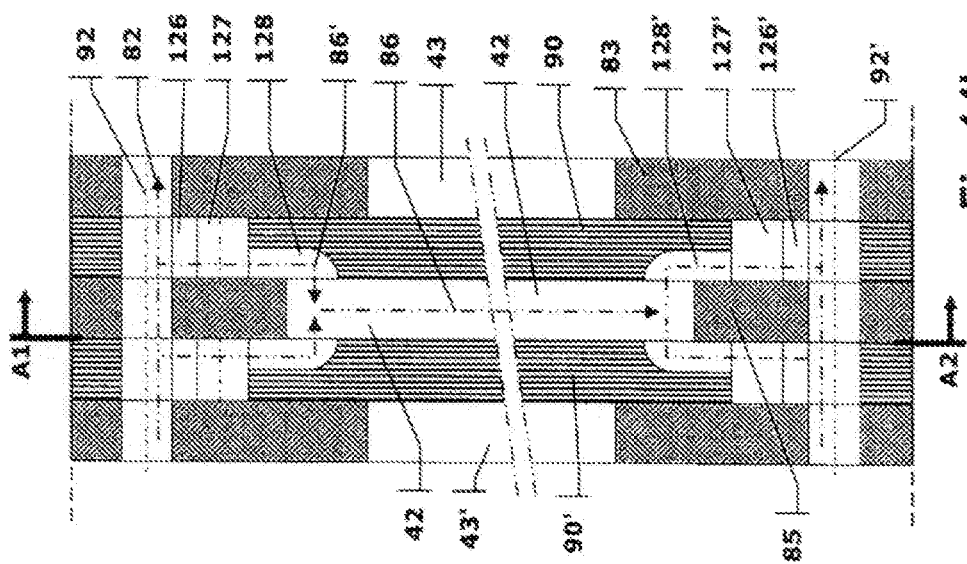

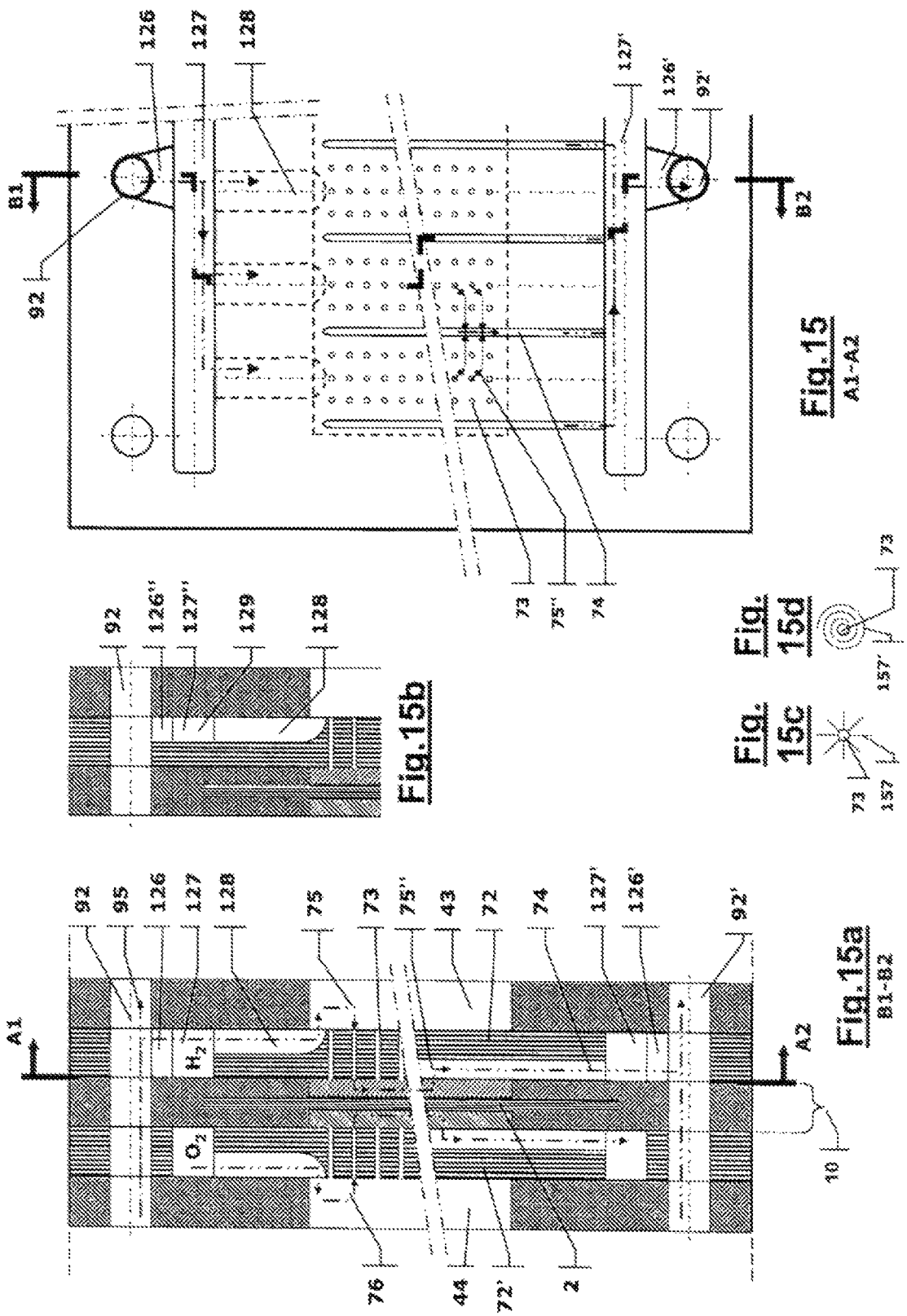

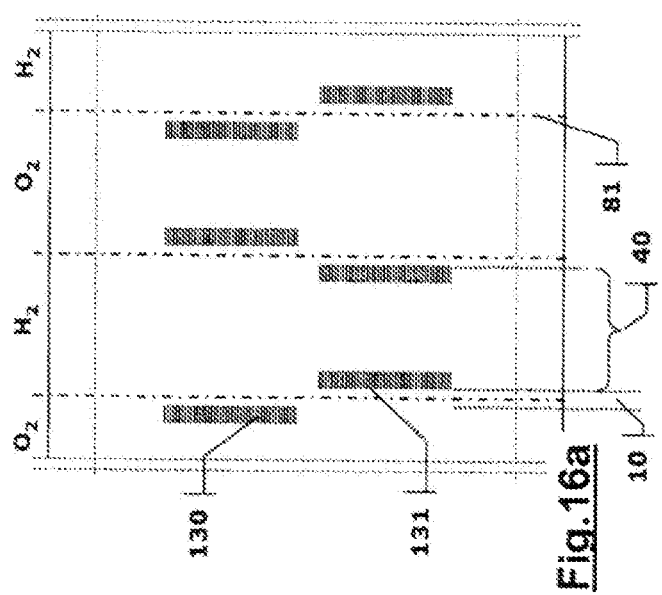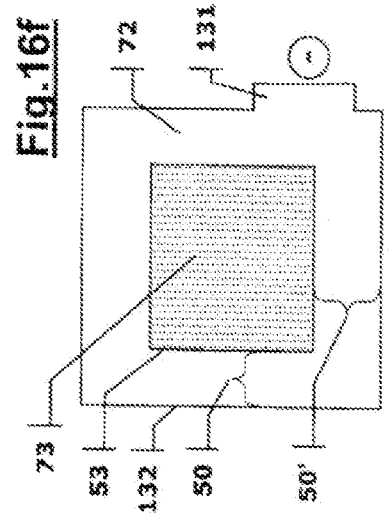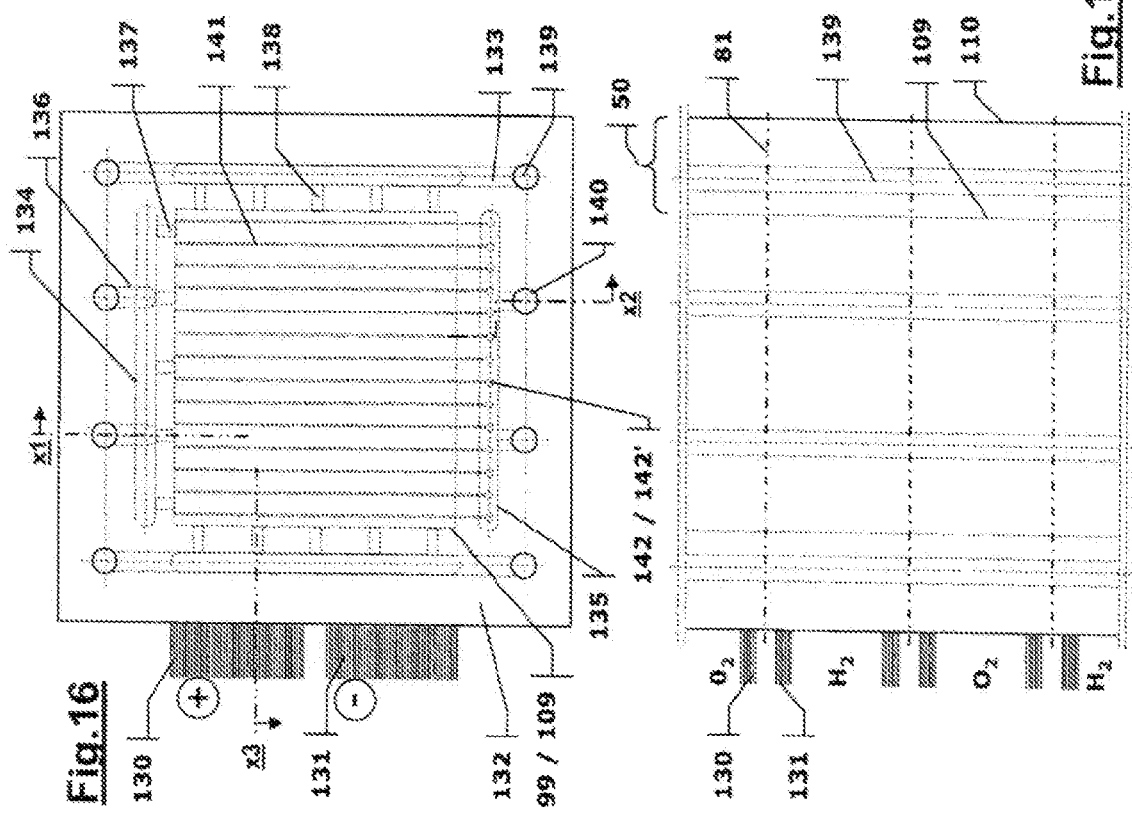

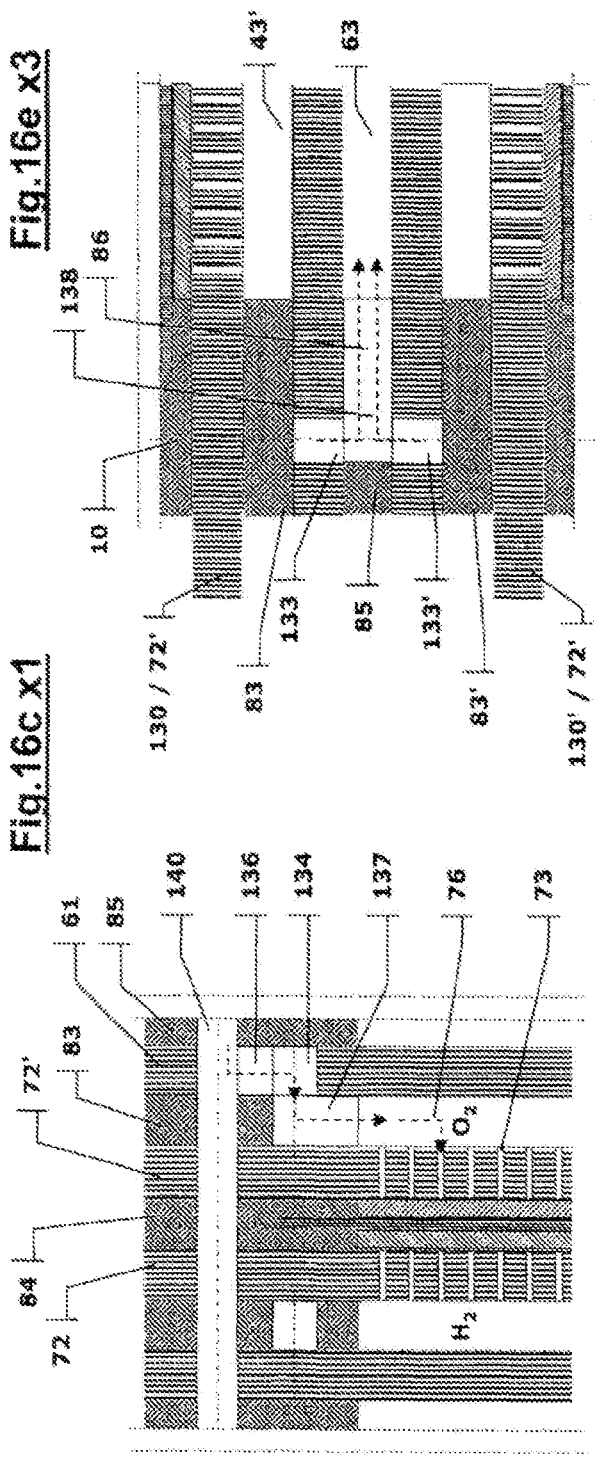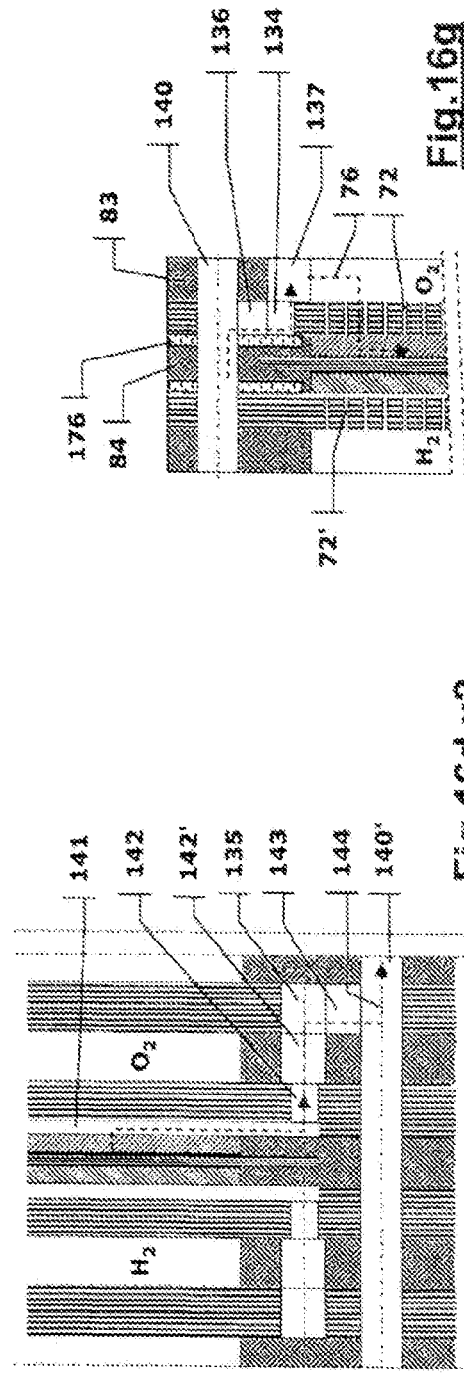

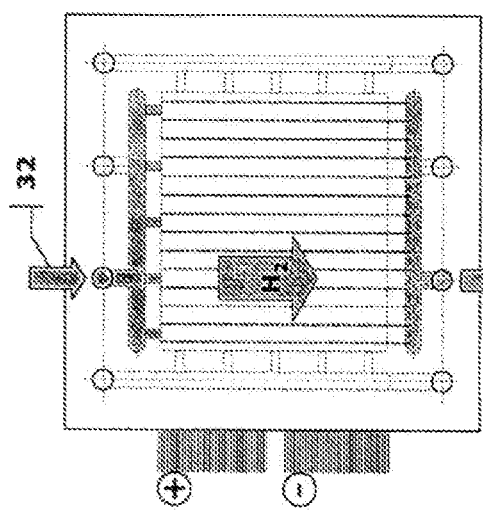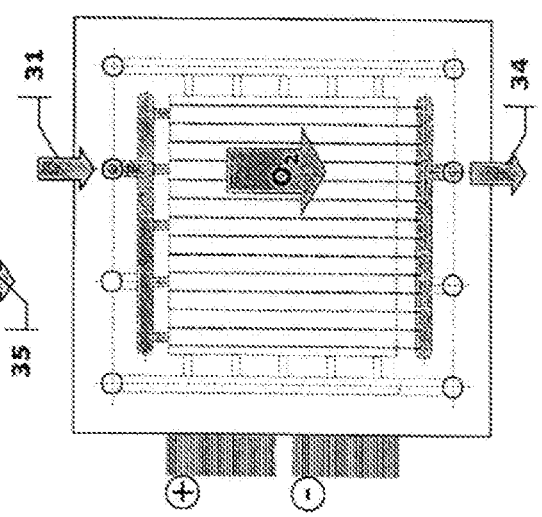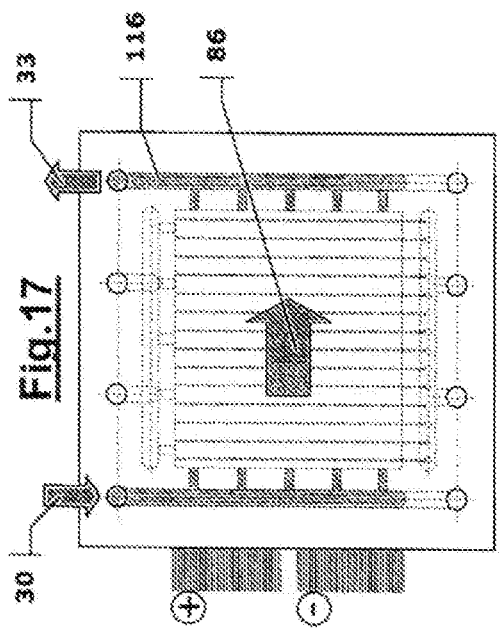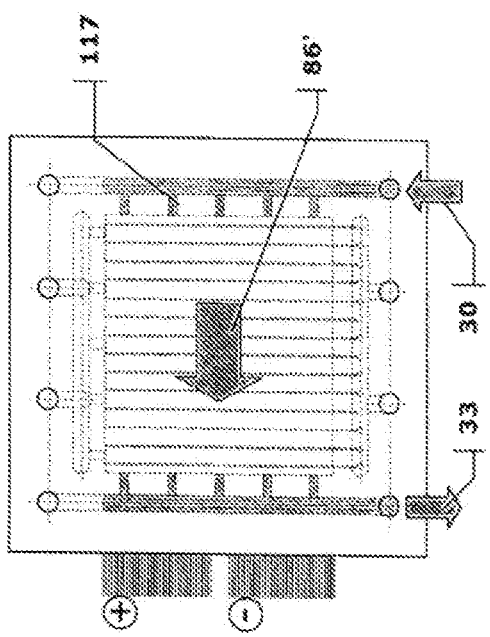

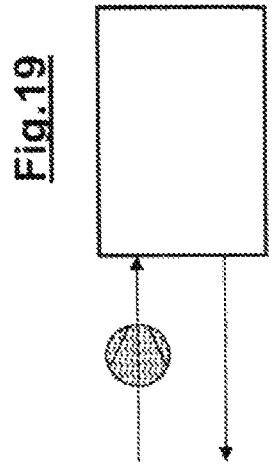
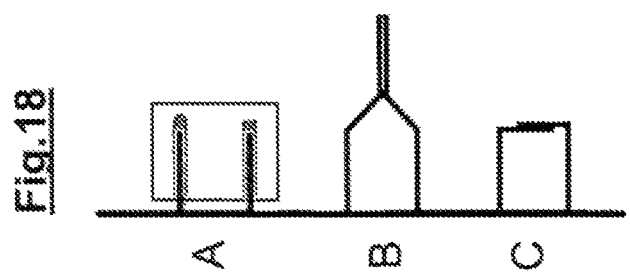

FUEL CELL WITHOUT BIPOLAR PLATES

This application claims the benefit of German Application 10 2008 057 253.5 filed Nov. 13, 2008, German Application 10 2009 015 619.4 filed Apr. 2, 2009 and PCT/DE2009/001614 filed Nov. 12, 2009, which are hereby incorporated by reference in their entirety as if fully set forth herein.

The invention relates to a fuel cell module consisting of a cell stack with end plates on the anode and cathode side having a tensioning system and having media connections for oxygen, hydrogen and coolant and a plurality of single cells having a membrane electrode assembly, each consisting of an electrode anode and cathode made of a porous gas-permeable material and an electrolyte membrane arranged between them with an anode and cathode catalyst and having current collectors on the anode and cathode side.

Such fuel cell modules are composed of single cells, which have an anode and a cathode on each side and an electrolyte membrane. Hydrogen is oxidized on the anode; the protons are converted into water on the cathode with the oxygen and the electrons that flow toward a current conductor via a consumer. Current flows when the anode and cathode are connected by means of an electrical conductor, and heat is released. The entire process can be operated continuously, i.e. oxygen and hydrogen are constantly fed to the electrodes. Such fuel cells are known, for example, from DE 12 72 679 A1 as well as from EP 0 490 808 A1. Electrodes with high porosity are used for such known fuel cells in order to have a large surface available for the electrochemical conversion. Said electrodes are covered on the membrane side with small particles of catalytic noble metals, in particular platinum or platinum alloy particles, as well as with current feeding layers. In conventional designs, oxygen and hydrogen are fed to the electrodes via bipolar plates, wherein fine channels are milled in these bipolar plates in order to finely distribute the hydrogen and oxygen over the surface of the electrodes. The oxygen and hydrogen are transported by diffusion from there to the reaction zones. Said bipolar plates have to be arranged on both sides of the membrane electrode assembly and are complex and expensive to manufacture. The above-mentioned channels are used as inlets as well as outlets of the media involved in the process of generating electrical current. A further disadvantage is that they feed unmixed gas and also discharge residual gases and reaction products. The humps of the paths remaining between the channels are used for conducting the current from the electrodes to the bipolar plates, while the cross section of the channel has to convey the required amount of gas. The resultant design conflict—large current transmission surface versus large flow cross section—is difficult or impossible to solve. Bipolar plates are large and strongly influence the dimensions of the entire fuel cell module. Moreover, they have to be good electrical and heat conductors and prevent gas diffusion from a single cell to the next one, for example, via so-called gas barriers made of corresponding layers of material, which are embedded in the bipolar plates. Gas diffusion is very difficult to prevent in bipolar plates, so that the gas loss rate can be relatively high, or the total efficiency of the fuel cells can be low. The bipolar plates have gas channels in order to allow the transport of process media. They are intended to promote the mechanical structure formation of the cell stacks. The disadvantage is that bipolar plates are not elastic, i.e. they have a rigid structure. It is further necessary that they be chemically and electrochemically stable in the presence of aggressive media and durable at operating temperatures up to 200° C. The search of suitable materials or a compromise between material and manufacturing process has not been satisfactory, and results in e.g. thick walls of the bipolar plates and thus inconvenient installation heights of the entire cell stack. Extracting the process heat resulting during the process is also difficult. The heat is either transported into the environment by the radiating stack body and a low stack performance is accepted, or the cooling channels are introduced into the bipolar plates with considerable disadvantages and manufacturing costs, in particular in designs that are produced with processes similar to injection molding. In this case, the disadvantages are the big installation heights due to the material properties of the bipolar plates and probably a double gas barrier. Stack designs, which provide cooling cells in a specific grid between the single cells and leave out the corresponding single cells, are therefore customary. This design makes sense when greater stack performances have to be achieved and high volumes of heat have to be discharged, but this is at the expense of the stack height or of the performance density per stack volume unit. The bipolar interconnection of such a stack causes that corresponding currents have to be conducted through the entire cell at a voltage potential that is in part inconvenient and not permissible for safety reasons. The subsequent conversion of the electrical magnitudes (practical scaling) is only possible with expensive electrical systems. Moreover, the entire stack fails when a single cell fails. The repair of such stacks is difficult or impossible; recovering expensive materials (catalyst particles) is only possible when the stack is disassembled, i.e. destroyed. Furthermore, spontaneous electrolytic "nests" can form, if the components, such as the bipolar plates, operate in an acid medium and current is flowing. The rigid structure of the bipolar plates causes that process tolerances and irregular heat expansions of the components involved in the stack (membrane electrode assemblies, bipolar plates, seals, end plates) add up over the cross section of the stack and result in a tilted position of the stack. A mechanical compensation of the stack orientation by means of a corresponding pretensioning by means of the tensioning device during assembly can then lead to leakages on one side and squashed edges on the other side, frequently associated with damage to the components, in particular to the seals. Another disadvantage is that the entire stack has to be brought to operating temperature with considerable amounts of energy, which has to be supplied by an energy source provided for that purpose, e.g. a correspondingly connected battery, before being actually started. In this way, damages to the membrane and catalysts can be prevented to a great extent.

It is therefore the object of the invention to provide a fuel cell module, which can be well manufactured and has small or narrow dimensions, by means of new arrangements and new components and does not require the use of bipolar plates.

This object is attained according to the invention in that the media inlets and media outlets have an allocated cooling and media module and are connected thereto, the cooling and media module is configured to provide secondary functional chambers and form the stack, and either the hydrogen electrode or the oxygen electrode of the membrane electrode assembly of the neighboring single cell is arranged on both sides of the respective cooling and media module.

With a single cell configured in this way, which can still be joined to other single cells to form fuel cell modules, it has been possible for the first time to eliminate the bipolar plates, because the cooling and media module is configured in a simple manner, can be produced at low cost, and is fully functional, although it need not be electrically conductive, and because a gas barrier can be fully be eliminated. As a result of the now simple interconnection, the current is taken via the allocated current flags from where it originates; i.e. it need not be conducted through the entire stack as in the prior art. The design of the cooling and media module is moreover substantially simpler than that of the bipolar plate because only the functional chambers; i.e. the media channels are required, without having to utilize an especially conductive material or having to use a gas barrier or the like. Variability is made available as a result of the simple design, which allows manufacturing fuel cells and/or fuel cell modules that not only are small, but basically also have a low stack height. Compared to the known design, the height of the stack can be reduced by a factor of three. This is at the same time associated with the advantage that it is possible to fully eliminate the large and complicated bipolar plates, and that each single cell can also be connected separately and arbitrarily in series, in parallel or individually, or in blocks and/or partial stacks, in such a way that in case one cell fails in a cell pack, the entire cell is still operative as such without problems. Reserve cells can moreover be provided, which can additionally be connected, and defective cells can of course also be disconnected without problems until a general overhaul is necessary.

An exact location of the cooling and media module and of the remaining functional units in the cell frame is made possible in that the cooling and media module with cooling channels and gas feed channels is configured with an elastic structure, preferably consisting of one or more components. These components, which are made of material that permits expansion, or the elastic structure, facilitate the fixation and alignment in the stack axis of the individual modules and functional units, wherein stainless steel and steel metal are considered for this embodiment. A tensioning relative to the cell frame or end plates and a uniform surface pressure of the membrane electrode assembly and compensation of process tolerances and heat expansions are achieved if the components correspondingly expand, which results in an improved function and the prevention of leakages or the like. This compensation results in particular when the inner stack of a cell stack is configured as a structure allowing for respiration in the stack axis.

It has already been mentioned above that sheet metal is basically provided as elastically expansible material, while the invention teaches that the cooling and media module or the up to seven components are made of steel metal, foil or cold-rolled stainless steel. Stainless steel is especially suitable because it cannot be affected by hydrogen or other aggressive components, so that a long service life of the module is achieved.

According to another embodiment, the cooling and media module is configured by up to seven components, as described above, made of plastic, preferably of plastic film. It should also be emphasized that, apart from the overall advantageous elasticity, aggressive media likewise cannot affect this plastic in this embodiment within the framework of fuel cell technology. The elasticity should also be emphasized.

The elastic expansion of the material is ensured in that the pressure in the cooling channels and the gas inlet channels can be modified and can be correspondingly adjusted to the surface pressure at the membrane electrode assembly. This refers to the inner stack whose expansion can be modified with limitations within the outer stack.

Thinnest sheet metal can be used for the embodiment made of sheet metal, because the invention provides that the electrode covers, sealing sheets, spring plates and components of the cooling channel and of the feed channels are separated by means of spacers. The number, shape and arrangement of the spacers are selected in such a way that the opening cross-section of the corresponding channel is respectively ensured along its full length.

Oxygen as well as hydrogen should allow for the chemical reaction and/or separation of the hydrogen and reaction of the oxygen in the region of the electrolyte membrane and of the catalyst lying on it, which is in particular possible and is ensured in that the gas inlet channels are provided with a partial inlet line and serve as partial gas distribution zone and a further gas distribution zone. In this way, it is ensured that the described processes can be accomplished over the entire surface of the electrolyte membrane, namely largely uniformly over the entire surface. This means that the gas components cannot only flow out of the gas channels at one point and be fed to the electrolyte membrane via the electrodes, but can be distributed over the entire surface at different points, so that gas distribution zones of uniform size and uniform configuration can be supplied with the gas. The individual sections of the electrodes are supplied by the gas distribution zones, each having at least one gas inlet from the gas channel through the electrode cover up to the electrode.

An especially uniform supply of the described gas distribution zones is attained in that the embodiment of the cooling and media module made from sheet metal, or in general the electrode cover of the gas channels of the cooling and media module, are provided with distributed gas inlets for hydrogen or oxygen as well as outlets for residual hydrogen, residual oxygen and reaction products. In this way, it is ensured for the first time that the process gases can be guided unmixed and uniformly out of the gas channels via gas outlets onto the electrodes and the reaction products mixed with the not always completely used hydrogen with its residual amounts and can be specifically discharged in such a way that the hydrogen gas flowing in via the gas channel and the electrode cover is not affected and can be reused after it has been treated. The same is applicable at the oxygen side, where it is even more problematic that water is also produced as a reaction product, according to the prior art, which then also has to be discharged. Separate channels and/or grooves are provided for drainage in this solution, by means of which these residual gases and reaction products can be discharged without negative effects, wherein the mixture with the process gases is prevented to a great extent, in particular because the process gases are conveyed to the electrode cover on one side and the process gases that have not been used and the reaction products are discharged separately on the other side of the electrode cover.

In order to ensure that the residual products from the drainages can be completely removed and/or automatically flow out, it is provided that the pressure in the outlets configured as grooves is lower than the pressure adjusted in the gas channels, so that a certain underpressure originates in these outlets, which ensures that the residual gases and reaction products flow out safely through the outlets.

As has been customary, it is possible to realize a planar layering of the electrolyte membrane and of the electrodes as well as of the cooling and media module with a fan angle of 180°, i.e. in order to make possible a parallel arrangement of the individual functional layers with respect to each other and to fix these between the cell frames.

According to a further embodiment, it is provided that the single cells are layered as fans with a fan angle of less than 180° which increases the active reaction surface in the order of up to 40% in comparison with the planar arrangements, in that the extended length of the module fan and of the reaction zone is larger than that of the corresponding length of its projection.

Another possibility of increasing the active reaction surface in the stack according to the invention is that in which the single cells are layered as stacked fans, always meaning of course only the active zone, not that of the cell frame. The humps of the fan are embedded in the fan recesses of the next cell.

Another embodiment is a parallel fan in which the humps of the fan stand on the humps of the fan of the next cell.

It has already been mentioned above that it is possible to assemble a fuel cell stack and/or a corresponding module in a simple and safe manner because the cooling channels and also the gas channels or the gas inlet channels are made of a material that allows for elastic expansion. The advantageous assembly is made possible in that the cell stack consists of an outer pack of component rings and sealing rings that form the cell frame as well as the inner stack or of a cell frame used as an outer stack as well as of the inner stacks of the membrane electrode assembly and of the cooling and media module. As a result of this, the pack of membrane electrode assemblies and cooling and media modules can be quasi inserted into the sealing ring pack so that a defined tensioning of the components of the inner stack against the cell frame and/or the outer stack can be safely accomplished by introducing the medium and the gases. The advantage is that the inner pack can be easily inserted and pushed in during assembly in order to only subsequently achieve the accuracy of fit by mechanical pretensioning and/or additional tensioning forces or by the applied media pressures.

It is especially advantageous if the length of the inner stack has a defined dimension (undersize, oversize) relative to the length of outer stack, so that the interaction of pretensioning and media pressure can establish a surface pressure in the membrane electrode assembly area, which is as uniform and defined as possible. The components are not tensioned and loose if the height of the inner stack is lower. The required media pressure and the adjustment to process tolerances and thermal expansions takes place only via the media pressures. The mechanical pretension is generated by the tensioning system. Spring plates between the cooling channel sheets or elastic or offset spacers cause a spring effect in the stack axis.

The so-called cell frame is formed by the membrane electrode assemblies, the cooling and media modules, and corresponding sealing rings. In order to skillfully realize the supply of the individual functional chambers, the cell stack is provided with cooling channel sheets of the same length and width according to the invention, wherein the cooling channel sheets limit the individual functional chambers with the seals in between them, and the cell frame formed by them has the required inlet channels, from which transverse channels, gas inlets, connection channels, distribution channels and distribution openings as well as other structures originate as a connection to the functional chambers. The supply to the functional chambers can thus be easily and safely established, in particular, of course, also in that the gas inlets as well as the outlets are provided in the electrode covers of the gas channels. Since said individual functional chambers of the cooling and media module cells are fed with gas by the same feed channel sections, but also with the coolant, it is ensured that the single cells are also respectively fed and can be continuously fed in the same way.

Since the single functional chambers have to be differently fed with hydrogen, oxygen and coolant, it is also provided that the inlet channels for hydrogen, oxygen and the coolant as well as the outlet channels for reaction products and excessive gases allocated to the cell frame are configured parallel and perpendicularly and the required cross sections are dimensioned to form the gas flow and structure. At least six such inlet channels have thus to be allocated parallel to the cell frame which, however, is possible without problems due to the dimensions, even having to consider that a single cell is only 2-3 mm wide or thick.

The stress on the cell walls or on the entire single cell by different temperatures of the coolant are minimized in that the cooling flow in the cooling channels is guided in the opposite direction from single cell to single cell and supplied by two uncoupled cooling systems. In this way, approximately the same stress and/or temperatures prevail over the full conveyance of the coolant because the coolant having the lowest temperature is alternatively conveyed into the cell stack, namely in such a way that the described compensation occurs automatically. With this arrangement, at least eight such feed channels should be provided running parallel, for the inlet and outlet for the oxygen side, cooling circuit 1 and cooling circuit 2, respectively. Residual gas portions that are diffused into the cell are separately conveyed, and if necessary treated, and electric potentials can be separated when separate cooling circuits, one for the oxygen side and one for the hydrogen side are provided.

In order to treat each single cell individually, it is especially advantageous if each single cell has current feeding layers or conductive lugs, which are each guided outward through the outer wall of the cell stack via conductive lugs. The conductive lugs of the single cells can be provided with connectors or be interconnected by clamping, welding, bonding, soldering or gluing. Parallel or also serial interconnection by means of the connectors or other types of interconnections is possible without any problems, so that a versatile use of such a fuel cell module and/or entire unit is possible.

Instead of configuring the electrodes as such for feeding current if necessary, it is also possible to provide the surface of the electrode anode and cathode with the electrically conductive live layer. This has advantages in terms of production as well as in terms of reducing production costs.

The medium module is not used as a conductor for conveying the current, but both electrode covers are used for transporting the current. For this purpose, it is advantageous if the electrodes are live and electrically conductive and rest on the electrode cover applying uniform surface pressure. The electrode cover is the live layer in this case. As a result of this, the originating current can specifically be collected and assessed, namely per single cell each time.

Another embodiment for carrying the current provides that the live layer is arranged on the same plane between the electrode anode and cathode and the cooling and media module and the current is transported via this electrically conductive plane. The electrode is electrically conductive.

If current carrying is arranged on the side of the electrode facing the membrane, the electrode is conveniently not electrically conductive, but instead heat conductive, porous with regard to gas diffusion and convection, and chemically and thermally stable.

In order to absorb the high temperatures at the cell stack or render them harmless, the cell stack or cell stacks are arranged in a ventilated stack housing, which has power poles and interfaces for the media supply, the ventilation of the stack, as well as of the voltage and pressure monitoring unit. An admissible temperature can be maintained at the outer wall of the stack housing by ventilating the stack housing. All of the lines required for controlling, regulating and supplying the module are introduced via the interfaces.

A convenient interconnection of the cell stack according to the invention is a parallel interconnection of the partial stacks and series connection of the cells in a partial stack or also any other interconnection, e.g. a parallel cell connection.

The cell stack conveniently consists of several partial stacks, of which one partial stack is configured and connected to serve the other partial stacks and connected to a heat exchanger. Heating a partial stack is easier and only requires little external energy, e.g. a battery. Once the starting stack has been started, the remaining partial stacks can then be brought to the starting temperature. It can furthermore be used as a redundant emergency power system.

The invention is characterized in that the height of the stack can be substantially reduced because, for example, the individual functional chambers are limited by correspondingly thin sheet metal components, preferably made of sheet metal or foil, wherein a reduction up to a factor of three is possible in comparison with known constructions. It is also an advantage that the single cells of such a cell pack and/or fuel cell module have several interconnection possibilities, wherein it, has proven especially advantageous that the current feed for each single cell can be respectively led outward through the outer wall via conductive lugs. The interconnection can thus be made in series or parallel, individually or in blocks and/or partial stacks as may be desired by interconnecting the conductive lugs. Another advantage is that this provides the possibility of disconnecting each single cell separately or also connecting it, e.g. by separating or interrupting the interconnection if, for example, reserve cells are kept ready for use. In such a fuel cell module, the active reaction surface can specifically be increased in that the single cells are realized as stacked fans or as parallel fans. The fan angle is 180° in the planar stack embodiment, i.e. the projection of the fan and/or active reaction surface corresponds approximately to the cross-sectional surface of the inner stack. If the fan angle is reduced, e.g. to 90°, the active reaction surface increases by approx. 40%, or it is 40° larger than its projection surface. With a comparative volume of the entire fuel cell module, it would theoretically have an approx. 40% higher nominal power. Electrolytic effects can be prevented in the cell and in the fuel cell module because the gas compartments and the components are uncoupled. It is also a big advantage that the gas diffusion zone and channels for the gas supply and gas disposal are uncoupled or separated, so that a continuous uniform conveyance of the gas and also of the coolant is ensured. The coolant is conveyed in the opposite direction via two uncoupled cooling systems in order to in this way uniformly stress the cells. It should finally be emphasized that in order to substantially facilitate the assembly, it is possible to specifically dimension the inner stack consisting of the membrane electrode assemblies and cooling and media modules to be inserted into the cell frame with excessively large or small dimensions, depending on the desired mode of operation. If it is undersized, not only process tolerances are advantageously compensated by the hydraulic and/or pneumatic effect of the new arrangement of the components, but also tilts due to thermally induced expansions of the involved components. As a result of its hydraulic or pneumatic effect, the coolant in the cooling and media module in particular, allows to correct the heat expansion and specifically and exactly compensate for the undersize. If it is oversized, the mechanically generated pretension can specifically be reinforced by the hydraulic or pneumatic effect of the gases and adjusted so that the allocation of the individual components is optimal. In this way, defined surface pressures in the region of the membrane electrode assembly, as well as an adjustment to different operating conditions can be achieved and realized by means of a specifically made oversize. Another advantage is finally that the current can be transported on the electrode surfaces so that it is easy to establish when current conduction is required. In this connection, the porous electrodes are coated with an electrically conductive layer made, for example, of carbon-based substrates and/or nanomaterials, so that the production of the electrodes is generally simplified.

Further details and advantages of the subject matter of the invention will become apparent from the following description of the corresponding drawings, which illustrate a preferred exemplary embodiment including the necessary details and individual parts. In the drawing:

FIG. 3a-3c show sectional views of a single cell with a different arrangement of the current conductive layer, FIG. 3d shows a hydrogen side.

FIG. 4 shows a simplified illustration of a single cell with planar layering,

FIG. 5 shows a schematic sketch of a single cell with planar configuration having cooling and media modules made of plastic, FIGS. 6, 6a show a simplified illustration of a fuel cell module in the form of a stacked fan, FIG. 7 shows planar single cells made of sheet metal, cold-rolled sheet or stainless steel foil, FIGS. 7a, 7b show an enlarged illustration and fan-shaped arrangement of the configuration according to FIG. 7, FIG. 8 shows a detail of FIG. 7 showing an enlarged illustration of the reaction zones for hydrogen and oxygen, FIGS. 9, 9a show an embodiment of the fuel cell module in the form of a parallel fan, FIGS. 10, 10a, 10b show different illustrations of a fuel cell module with connectors arranged on the outer wall, FIG. 11a shows a coolant supply channel and traverse channel.

FIG. 11 shows a simplified sectional view with connections to the functional chambers, FIGS. 12, 12a, 12b show another simplified sectional view with a connection to the functional chambers, for hydrogen in this case, FIGS. 12c-12e show inner stack variations.

FIG. 12f shows a compensation and distribution groove.

FIG. 12g shows a cooling and media module.

FIGS. 12h and 12i show electrode covers.

FIGS. 13, 13a, 13b show a simplified sectional view of a fuel cell module with parallel cell connection, cooling circuit and showing several partial stacks, FIG. 14 shows transverse and distribution channels.

FIG. 14a and 14b show cooling channel details.

FIGS. 15a, 15b show a simplified illustration of the electrode cover of a membrane electrode assembly, FIGS. 16-16e show different views of the fuel cell module, FIGS. 17-17c show a simplified illustration related to the coolant, oxygen and hydrogen feed, FIG. 18 shows variations of bearing lug connections, and FIG. 19 shows a fuel cell module with cooling air supply.

Figure 1:
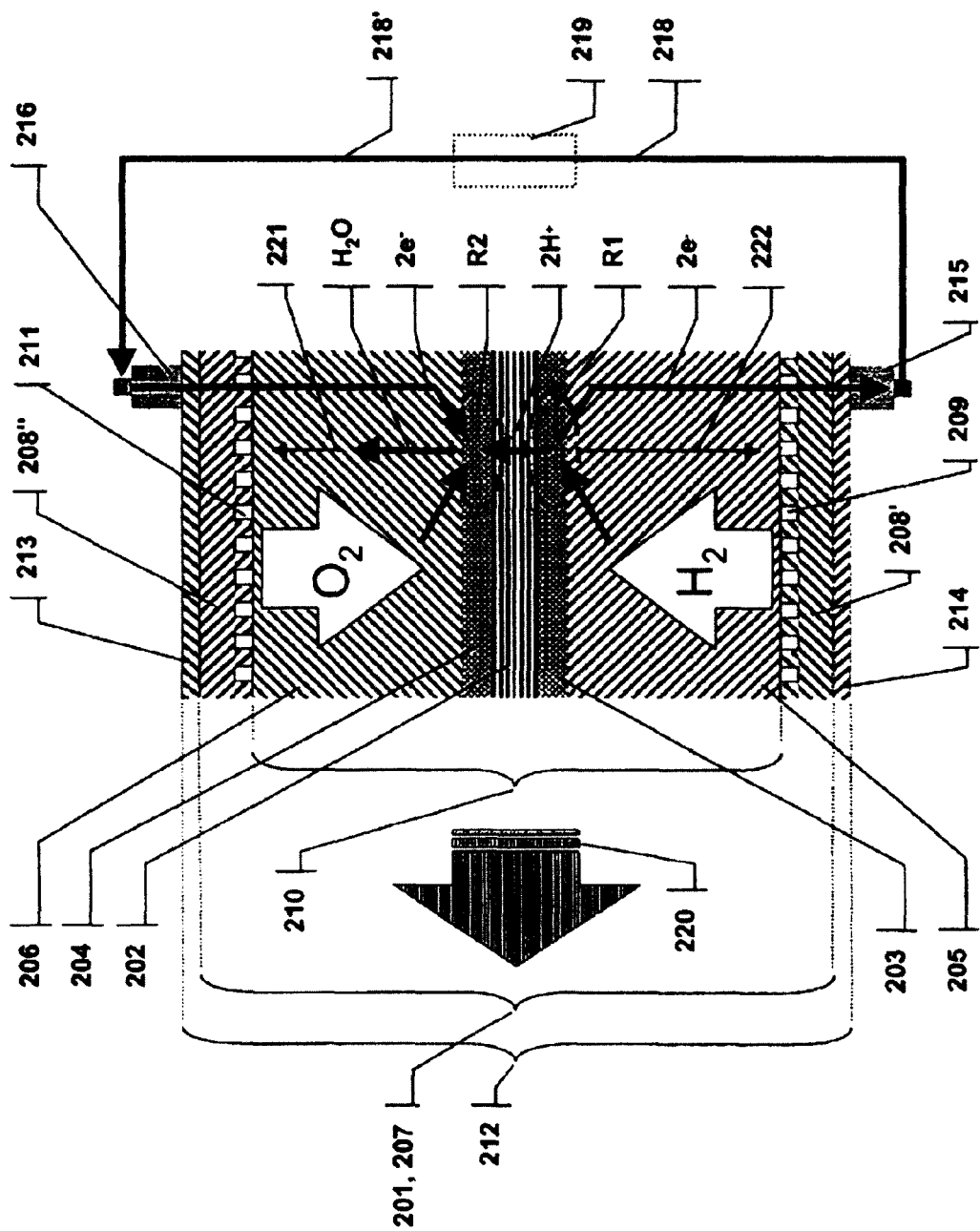
FIG. 1 shows a single fuel cell in a simplified representation according to the state of the art.

FIG. 1 is a simplified illustration of a single cell 207 of a fuel cell module 212 according to the state of the art. The electrolyte membrane 202 has an anode catalyst 203 and a cathode catalyst 204 as well as the enlarged anode 205 and cathode 206, that is, thus the electrodes. The cathode 206 and the anode 205 are limited by bipolar plates 208', 208" which have channels on the gas distribution anode side 209 and gas distribution cathode side 211 and respective opposite end plates 213 and 214. The cell stack, which is only implied here, is designated with 201.

Figure 2:
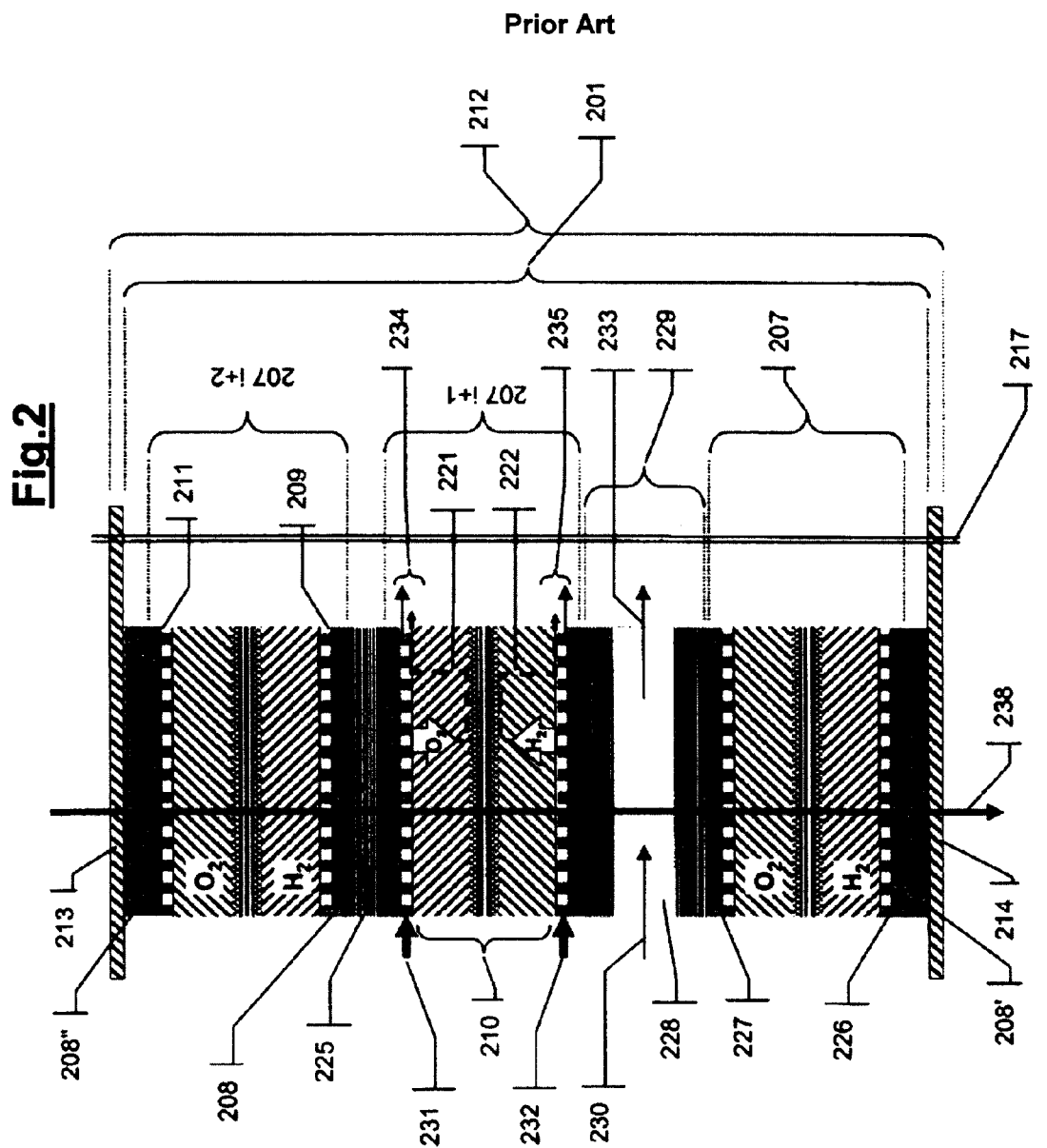
FIG. 2 shows a simplified illustration of a fuel cell module according to the state of the art with a bipolar plate.

The illustrations according to FIG. 1 and also according to FIG. 2 are related to the state of the art. They show the supply of oxygen (02) and hydrogen (H2). The respective reaction zones for the hydrogen and oxygen are designated with R1 and R2. The current collectors 215 and/or 216 are used to transport the current and are connected to one another via the conductor 218', 218" and the consumer 219. The hydrogen (H2) flows to the anode 205 via the gas distribution at the gas distribution anode side 209 and diffuses through said anode 205 to the reaction zone R1. The anode catalyst 203 causes hydrogen to separate (H2 oxidation) into protons and electrons. The protons are transported by the electrolyte membrane 202, namely from the reaction zone R1 to the reaction zone R1. The electrons are conducted through the bipolar plate 208' to the current collector 215 via the anode 205. The electrons are conducted by the current collector 215 to the current collector 216 via the conductor 218 and the consumer 219. The oxygen (O2) flows to the cathode via the gas distribution cathode side 211 and diffuses through the cathode 206 to the reaction zone R2. The cathode catalyst 204 causes the oxygen to reduce to water by involving the protons from the reaction zone R1 and the electrons flowing in via the conductor 218'. Process heat 220 develops in the reaction zones, which has to be dissipated. This process heat 220 is normally transferred to a coolant flowing—in corresponding cooling channels—via the electrodes and the bipolar plates 208', 208". Reaction products and unused residual gases are discharged underneath 221, 222, preferably by convection, from the electrodes 205, 206 at the gas distribution side 209 and at the gas distribution cathode side 211.

FIG. 2 shows an embodiment of a fuel cell module 212 consisting of a cell stack 201 with a plurality of single cells 207, 207$i$+1, 207$i$+2, wherein a bipolar plate 208 is arranged at each of the two sides of the membrane electrode assembly 210 of a single cell 207. The cell stack 201 is covered on each side by end plates, which are identified with 213 and 214. The gas barrier 225 in one of the bipolar plates 208 is also drawn in here. The positive side of the bipolar plates is identified with 226, the negative side with 227, while the cooling channels are provided with the reference numeral 228. 229 is a cooling cell, while the inlet for the coolant is provided with the reference numeral 230, for the oxygen 231 and for the hydrogen 232. The outlet of the coolant is identified with 233. Reference numeral 234 identifies the outlet with unused oxygen and the reaction products 221, in particular water and water vapor, on the oxygen side. Reference numeral 235 identifies the outlet with unused hydrogen and reaction products 222 on the hydrogen side. The bipolar current feed is identified with 238, while the reference numeral 214 identifies the MEA, i.e. the membrane electrode assembly. Reference numeral 217 identifies the customary clamping anchor. The gas barrier in the bipolar plate 208 is identified with 225. It is intended to prevent the undesired diffusion of gases (H2, O2) through the bipolar plates and thus any uncontrolled reactions, wherewith the current conduction is impeded and the heat conductivity is reduced.

Figure 3:
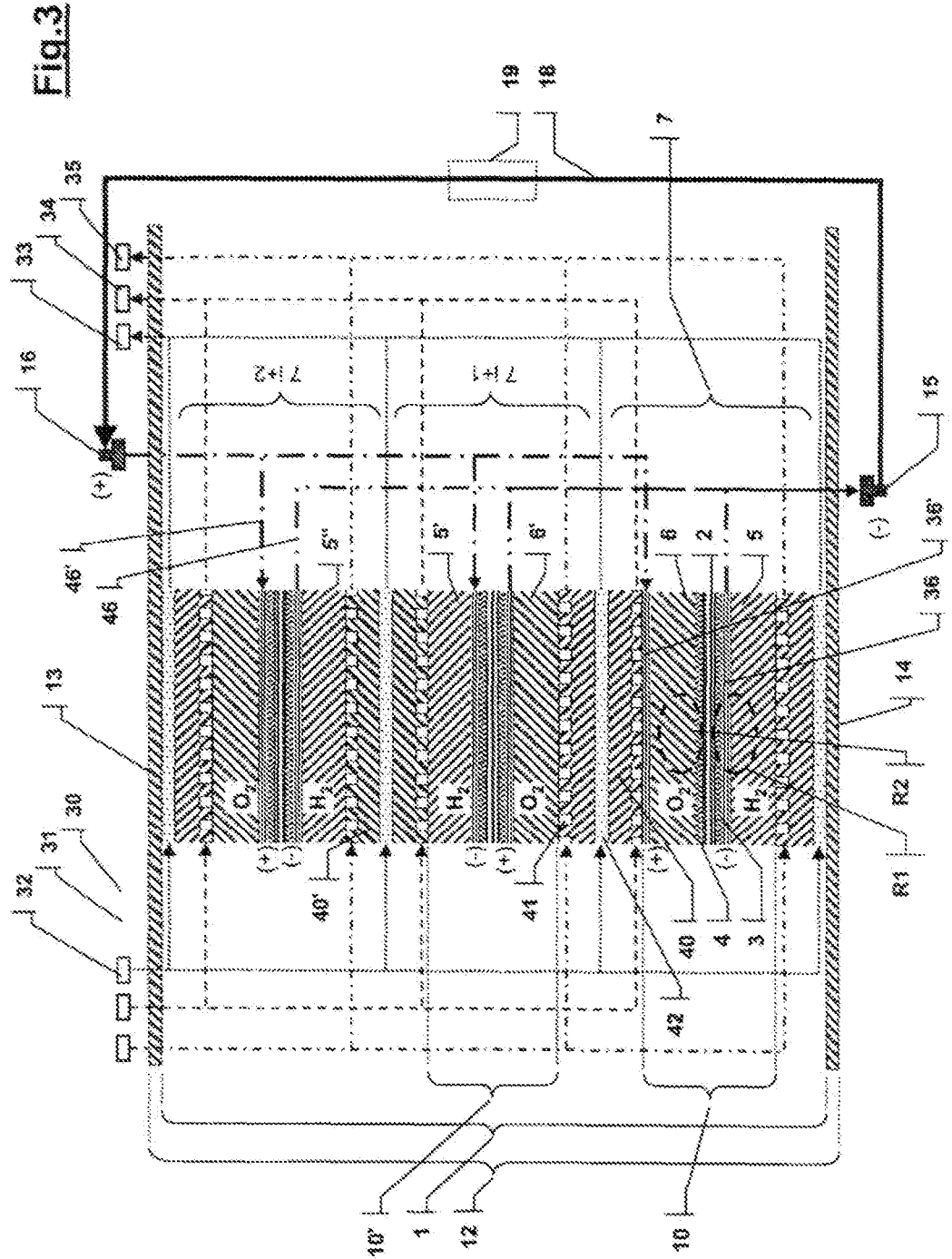
FIG. 3 shows a fuel cell module.

FIG. 3 shows the embodiment of a fuel cell module 12 consisting of single cells 7, 7$i$+1, 7$i$+2, which all make do without bipolar plates, or in which such an embodiment has not yet been provided. In this fuel cell module 12, the end plates are identified with 13, 14 and the current collectors with 15 and 16. A membrane electrode assembly 10 is provided for each single cell 7; which are each identified with an electrode anode 5 and an electrode cathode 6. A catalyst 3, 4 is allocated to each electrode 5, 6.

It can be seen that a coolant module 40' is arranged between two electrode anodes 5', 5" for the hydrogen, and/or a cooling and medium module 40 between two electrode cathodes 6, 6' for the oxygen. It is shown by way of example that the cooling and medium module 40 is arranged at the oxygen side of the cells 7 and 7$i$+1 and has been designed for this position, and that the cooling and media module 40' is arranged on the hydrogen side of the cells 7$i$+1 and 7$i$+2 and has been designed for this position.

Both (+) poles of the adjacent cells 7 and 7$i$+1 are both situated on the side of the cooling and media module 40. Both poles have the same electrical potential, which is the reason why no current flows between them. Should gas diffuse from the gas distribution channels into the cooling channel 42 via the structure of the cooling and media module 40, this would only concern one gas. This excludes the formation of uncontrolled zones with electrolytic properties. A spontaneous gas reaction is also excluded, since only one gas diffuses into the functional chamber.

This is similarly also applicable to the hydrogen side for the cooling and media module 40' between the cells 7$i$+1 and 7$i$+2, whose (−) poles are opposite to each another, with the cooling and media module 40' arranged between them.

The interconnection of the (−) poles is identified with the reference numeral 46 and the interconnection of the (+) poles of the cells 7, 7$i$+1 and 7$i$+2 is identified with 46'. This interconnection provides, for example, a parallel interconnection of the cells with one another in FIG. 3. The poles of the single cells can also be connected in series by simply reversing the polarity.

The electrode anode 5 is not electrically conductive and has, for example, a surface 36 on the membrane side, which is configured as a live layer. In contrast, the electrode anode 6 is electrically conductive and has, for example, a surface 36' on the membrane side, which is configured as a live layer. The cooling and media module 40 is provided with gas distribution channels 41 and cooling channels 42, wherein the cooling and media module 40 are not used as current conductor, but only for the provision of secondary functional chambers, of the gas distribution channels 41, and the cooling channels 42, and for stack formation, that is, to form the geometrical structure of the stack. Instead of the term functional chamber, the term functional zones is also conceivable, because these functional zones are situated between the individual membrane and electrode assemblies 10 and 10', which lead to the opposite cell frame 50.

It is further apparent from FIG. 3 that two different embodiments have been realized for current feed purposes by arranging the current feed layer 36 on the plane of the reaction zone R1 and of the catalyst 3, wherein the current is discharged at the same location where it originates. The electrode 5 does not have to be electrically conductive, but is only used for gas diffusion, heat dissipation, preferably by convection, and for discharging reaction products. It is further apparent that the current feed layer 36' is arranged on the plane of the reaction zone R2 and of the catalyst 4, the current being likewise discharged where it originates. The electrode 6 has to be electrically conductive, so that it is also used for gas diffusion, heat dissipation and for discharging reaction products, preferably by convection. The current conductive layers can be produced by coating the respective surface, for example, with nanomaterials or carbon supported substances.

The embodiment of the cooling and media module 40 shown in FIG. 3 has gas distribution channels 42 on its surface, which are used as inlets for the process gases and as outlets for residual process gases, and for the resultant reaction products. Cooling and media modules 40 configured in such a manner are preferably made of plastic in that two halves of a module are connected to one, another by, gluing or welding.

FIG. 3a shows an especially advantageous embodiment of the cooling and media module 40, 40'. It shows a cooling and media module 40 on the hydrogen side with two electrode covers 72 and two cooling channel sheets as well as spacers 79, and further a cooling and media module 40' at the oxygen side with two electrode covers 72' and two cooling channel sheets as well as one-piece spacers 79 and, for example, a two-piece spacer 79'. A membrane electrode assembly 10 is arranged between the two cooling and media modules 40, 40'. Another membrane electrode assembly identified with 10' is indicated below the cooling and media module 40 and shows that this membrane electrode assembly 10' likewise faces toward the cooling and media module with its hydrogen side. The stacking structure, which is not, shown in detail, is similarly carried out on the oxygen side.

Reference numeral 155 identifies the elastic deformation of the cooling channel sheets in the direction of the stack, which is promoted by the offset arrangement 153 of the spacers 79, and reference numeral 155 identifies the elastic deformation of the spacers 79 in the implied stack axis 166, which is shown in principle, wherein the spacers 9 are provided by way of example, namely in an offset arrangement. The stacked structure can "breathe" as a result of the elastic bending of the components when the thermally induced length variations or the differently dimensioned components so require due to process tolerances. An advantageous elastic behavior of the inner stack 109 is obtained from this structure in particular during the assembly, because process tolerances as well as heat expansions of the components involved in the stack formation are simply compensated when the stack is operated. A specific mechanical pretensioning of the entire stack in the stack axis 111 can furthermore be achieved by correspondingly dimensioning the spacers in the stack axis because a stack with this structure acts similarly as a compression spring acting on axially external and internal forces.

FIG. 3a additionally shows that the centrally arranged MEA 10, that is, the membrane electrode assembly, is enclosed on both sides by a respective cooling and media module 40, 40'. The cooling channel and the gas channels are identified with 42 and 43, 44 respectively, where the flow direction of the oxygen 96, 96' and of the flow direction of hydrogen 95, 95', and the opposite flow direction of the coolant 86 of the first cooling circuit and of the coolant 86' of the second cooling circuit are indicated. The electrode cover is identified with 72, 72', namely on both sides of the membrane electrode assembly 10. The current feeding plane on the anode side and cathode side of the electrode cover is identified with the corresponding reference numerals 105, 105'.

The illustration in FIG. 3b shows that the live plane 106, 106' is arranged between the electrode 5, 6 and the electrode cover 72 on the anode and cathode side, while this live plane 107, 107' is arranged in the membrane region 2 between the catalyst 3, 4 and the electrode 5, 6 according to FIG. 3c. Reference numerals 36 and 36' identify the electrically conductive electrode surface made, for example, of a nanomaterial.

In addition, in an enlarged detail of FIG. 3a, FIG. 3d shows by way of example for the hydrogen side how the hydrogen H2 flows through the gas inlets 73 into the electrode 5 and how the reaction products and unused residual gases, in this case residual hydrogen, flow out through the gas outlet 74 grooves being led out of the stack via the outlet at the hydrogen side 35. This clearly shows the separate media feed, as the process gas is fed on one side of the electrode cover 72 from a channel 43, which is only provided for that purpose, and the residual gases and reaction products are fed on the other side of the electrode cover 72. This also applies in a similar way to the oxygen side.

FIG. 4 shows a fuel cell, or a cell stack 1, in which the single cells 7 are arranged in planar layers are arranged one over the other and are enclosed by the cell frame 50. The compact embodiment of the cooling and media modules with the membrane electrode assembly is identified with 40, 40'. 53 is a frame window in which other such single cells can be allocated to this pack. The fan angle is designated with 54, 180° in this case, so that the active reaction surface is equal to the window frame surface.

A cooling and media module 40 is arranged between two membrane electrode assemblies 10, 10' in FIG. 5. This cooling and media module 40 consists of two components 60, 60' connected to each other, which are made of plastic in this case and in which a cooling channel 63 as well as an inlet channel 65 are provided for fuel gas. The reference numeral 64 implies that the cooling channel 63 and the entire cooling and media module 40 are configured elastically or allow elastic expansion if there is gas pressure in the cooling channel 63 or it is correspondingly adjusted. By means of this coolant pressure 64, the elastically deformable cooling and media module 40 or the corresponding components 60, 60' are deformed, so that an advantageous gas distribution zone 67 or partial gas distribution zone 68 can be achieved in the region of the membrane electrode assembly 10. It is apparent that the gas can be uniformly fed into the region of the membrane electrode assembly through the transverse channels 66, 66' of the inlet channel 65. The process gas pressure is indicated with 69, by means of which, exactly as through the cooling channel 63 and the coolant pressure 64 prevailing there, the elastic deformation can be achieved. This results in that the process tolerances of the stacked functional elements as well as heat expansions through elastic expansion can be compensated for in such a way that an optimal surface pressure is applied on the membrane electrode assembly 10, 10'. The surface pressure difference is pF=pKM=pPG with pKM>pPG. The surface pressure (pressure difference) can be adjusted in dependence upon the operating point of the fuel cell 5 by modifying the pressure of the coolant 64 (pKM) or of the process gas pressure 69 (pPG). The resultant surface pressure is achieved by means of the forces applied by the media and those forces in the stack axis that are applied by mechanically tensioning the stack. The partial inlet or outlet 66 or the corresponding transverse channels 66 into the partial gas distribution zone 68 allows for the optimization of the media flow in the gas distribution zone 68.

FIGS. 6 and 6a show a cell stack 1 with the cooling and media module 40 in a stacked fan arrangement, preferably consisting of two plastic components which are glued or welded into one another and gas distribution channels 41 and cooling channels 42. Said stacked fan, with the humps of the fan 58 nestled into one another, is identified with 56 and it can be clearly seen in FIG. 6a that a fan angle 47 of approximately 90° has been achieved. The cooling and media module 40 is not used as a conductor, but only its surface, which is provided with a corresponding electrically conductive layer 45. The current is transported via the conductive lugs 130 and the connectors 80, which are shown here by way of example. The cooling and media module 40 is only used to provide the secondary functional chambers or functional planes 41 (i.e. 43 and 44) and 41, to carry the current conductive layers (45), and to form the stack, that is, also an overall embodiment. The cooling channels 42 and the gas distribution channels 41 or gas channels 43, 44 can also be rotated 90° that is, not arranged on the fan plane, as drawn. The process gases are conveyed in the fan axis by way of example in FIG. 6.

FIG. 7 shows a planar embodiment of a cell stack 1, that is, the fan angle is 180°. The cooling and media modules 40, 40' are configured to be multi-part, that is, they consist of 2 electrode covers 72, 72' and 2 components 90, 90' each, in order to configure the cooling channels 42, 42', the cooling channel sheets, as well as several spacers 79. The membrane electrode assembly is identified with 10 and is enclosed by a cooling and media module 40, 40' on both sides. The walls or sheets that form the individual cooling channels 43, 44 are made of sheet metal, wherein said sheets rest against each other via spacers 79. A cooling and media module 40, 40' consists, for example, of four sheet metal sheets or also metal foils, where the electrode covers 72 are available on the outer side and cooling channels sheets 90 are available on the inner side. Said spacers 79 are arranged on the cooling channel side 78 as well as on the oxygen and hydrogen side. The coolant pressure prevailing in the cooling channel 43, 43' is also identified with 64 here. The spacers 79 can be undersized; the total surface pressure that has to be applied to achieve good efficiency in the region of the membrane electrode assembly 10 is then generated by the media pressure. A particular advantage is that the uniform pressure is applied on the membrane electrode assembly 10, even if irregular component dimensions or irregular heat expansions occur when the fuel cell module 12 is operated. The spacers 79 can also specifically be arranged and molded in such a way that said spacers 79 react elastically to irregular component dimensions or irregular heat expansions up to a certain degree and yield, for example, by offsetting the spacers 79. The elastic bending of the individual components allows the stacked structure to "breathe" and yield when thermally induced changes in length or different component dimensions so require due to process tolerances. If the spacers 79 have a "compact" design, the structure in the stack axis will be rigid.

FIG. 7a shows a fuel cell module 12 having a fan angle 54 of 180°, with a planar component structure with cooling and medium module 40. With this design, the projection of the active reaction surface approximately matches its projection surface on the frame window 53; it is approximately equal to the cross section of the inner stack 109. The cell stack 1 is covered with a respective half of the cooling and medium module assembly 40" and with a respective end plate 13, 14.

FIG. 7b shows the detail of a cell stack 1 with a fan angle 47 smaller than 180°, in this case approximately 90°. With this design, the active reaction surface is, larger than its projection onto the frame window 53; it is larger than the cross section of the inner stack 109. The single cells 7 of this fan, with the ends of the fan 58 nestled into each another, are stacked with the membrane electrode assembly 10 and cooling and medium modules 40. The seals are not represented. The process gases can be fed to the fan axis similarly as in FIG. 6. The construction allows feeding the process gases transversely to the fan axis as well FIG. 8 is the illustration of an enlarged detail of FIG. 7 to exemplify where in the membrane electrode assembly 10 the reaction zones R1 and R2 for hydrogen and oxygen are configured. The electrolyte membrane 2 is also positioned here, and this membrane electrode assembly 10 is limited on both sides by the electrode covers 72, 72' of the inlet for oxygen 70 or hydrogen 71. Gas inlets 73 and gas outlets 74 and gas outlet grooves, are provided in the electrode covers 72, 72'. The respective process gas flows through the gas inlets 73 into the region of the membrane electrode assembly 10 in order to remove the residual gases and reaction products with the reference numeral 74' from the functional area through the gas outlet 74. This applies similarly to the oxygen and hydrogen side, as described below. It is also clear that only a partial flow 75 of hydrogen reaches the region of the membrane electrode assembly, while other partial flows are fed to the membrane electrode assembly 10 through the other gas inlets 73. This makes clear that clearly separate gas flows are realized with this design upstream and downstream of the electrode covers 72, 72'. The process gas flows in unmixed state through the respective supply lines or gas channels 70, 71 and from there through the gas inlets 73 to the electrodes 5, 6, where the gas diffuses to the respective reaction zone R1, R2. From there, the unused residual gas and reaction products, e.g. water or water vapor, flow preferably by means of convection into the outlets or gas outlet grooves 74, 74'. The pressure in the gas outlet grooves 74, 74' is lower than in the porous electrodes 5, 6, as a result of which the discharge of gases and reaction products is promoted. The extraction of the process heat 20 from the reaction zones R1, R2 via the electrodes 5, 6 and the gas channels 43, 44 to the coolant 82 and the cooling channels 63, 63' is additionally shown. The process gases flowing to the gas channels 70 (O2) and 71 (H2) are heated up, because a good cell efficiency cannot be achieved with "cold" process gases. The counter flow 86, 86' in the cooling channels 63, 63' is also shown, which means that a uniform temperature profile can certainly be achieved through the cross section of the cell. The individual components of the cooling and media module 90, 90', 72, 72', 79 are preferably made of stainless steel sheet. Designs that utilize corresponding thin-walled plastic components are consistent with the invention.

FIG. 9 shows the embodiment of a cell stack 1, in particular of the cooling and media module 40, in which the design with two plastic parts 60, 60' is realized, which results in a parallel fan 57 with a fan angle 47 of <180°. The lateral border of the membrane electrode assembly 10 can also be identified here by the cell frame 50, which has still to be described. In this illustration, the cooling and medium module 40 consists of two elastic plastic parts, which are glued or welded together at the joining plane 60". Herein are shown the design and location of the media feed with a gas channel 43 for hydrogen, a gas channel 65 for oxygen, transverse channels 66, 66' for the transport of process gases from the gas channels 65 to the membrane electrode assemblies 10, the cooling channel 63", which is shown in this case, for example, with an additionally integrated tube-like sleeve, and the current conduction, in this case, for example, with connectors. The process gases are conveyed in the fan axis.

FIG. 9a exemplifies the basic design of a parallel fan 57, wherein the individual membrane electrode assemblies 10, 10' are respectively designed in such a way that the described parallel fan is obtained because the fan humps 58 are mutually superposed.

According to FIG. 10, the fuel cell module 12 consists of a multitude of single cells 7 formed as a cell stack 1. In this cell stack 1, the current feeds 45, 46, which are no longer visible, but are shown in FIGS. 3 and 5, are led out through the outer wall 48 to allow the attachment of connectors 80, by means of which an interconnection is possible in the desired manner. FIG. 10 shows a simplified perspective view of a fuel cell module 10, wherein the parallel interconnection of cells or partial stacks are shown with protruding conductive lugs or connectors by way of example.

FIG. 10a shows a simplified view with the protruding conductive lugs 130, 131, which are part of the electrode covers and the plane 81, which is indicated between them, in which the membrane electrode assembly of the corresponding cell is situated.

FIG. 10b shows, in turn, a simplified sectional view of an entire stack housing 100, where the power poles 115 are not visible. It shows the different interfaces for media, power poles and the control and regulation. The ventilation of the stack housing 100 is suggested. The fuel cell module 1 can be heated to a temperature of 200° C. at the outer wall. The ventilated stack housing 100 has ambient air at its outer wall 108 as a result of the ventilation, of which the incoming air is identified with 101 and the exhaust air is identified with 102. The power poles at the stack housing 100 are identified with 103, the interface-control-regulation is identified with 104, the media interface with 104', and the outer wall with 108, as described above. All electrical, hydraulic and pneumatic connection lines and elements necessary for controlling and regulating the fuel cell module are led via the interface 104. All connection lines and elements necessary for the operation of the fuel cell module are led via the interface 104', in particular inlets for process gases and coolants and outlets for unused process gases and reaction products.

FIGS. 11, 11a and also FIGS. 12 and 12a show simplified sectional views of a cell stack. The compact design of the cooling and media module is identified with 40, 40', where it can be seen that the individual functional chambers or functional planes of the cooling and media module 40, 41 are supplied with the respective medium via supply channels 92.

In FIG. 11, the coolant 82 is conveyed through the supply channel 92, which is made by means of bores configured in the seals 83, 84, 85 as well as in the metal sheets 90, 91 arranged between them. This supply channel 92 has transverse channels 93 in the respective "working planes", via which the coolant 82 or, according to FIG. 12, also hydrogen 95 or also oxygen is conveyed into the respective plane or into the cooling channel 42 or gas distribution channel 41. The shown seals 83, 84, 85 and the corresponding sections of the metal sheets 90, 91 form the above-mentioned cell frame 50, which has several, preferably at least six, of the described supply channels 92 in order to supply and again discharge hydrogen or oxygen, on the one hand, and the coolant, on the other hand.

FIG. 11a shows the supply channel 92 and the transverse channel 93 originating there, which in this case is configured in the seal 83. It is understood that the corresponding bores are configured similar to the individual seals 83, 84, 85 and also 83' and, of course, also similar to the sheet metal sheets 90, 91. The projected reaction surface is identified with 99 (FIG. 11), which measures, for example, 150×150 mm.

FIGS. 12, 12a and 12b exemplify the inflow of hydrogen 95. They show the inflow of hydrogen 95 from the channel 92 via the transverse channels 93 and the gas channel up to the reaction zone. The gas inlets 73 and the gas outlet grooves 74 are provided for this purpose. The spacers, which separate the individual sheet metal sheets 90, 91 are identified with 79, 79'. The waves identified with 94 show the elasticity structure achieved by means of the sheet metal sheets 91, 90 and the spacers 79. A structured sheet metal sheet, whose structure still increases the axial elasticity, for example, in the form of grooves, can be used.

FIG. 12a again shows a sectional view of a gas channel seal 83' with the supply channel 92, the supply channel connection 87'', the transverse channel 93, and the arrow for the hydrogen 95.

FIG. 12b shows an enlarged view that depicts how the different spacers 79 or also 79' can be configured. Different spacer concepts are possible, for example, rigid, flexible spacers executed as humps or embossed on the electrode covers.

In an enlarged view, FIG. 12b shows how the different spacers 79 or also 79' can be configured. Different spacer concepts are possible, for example rigid, flexible spacers 79, 79' executed as humps or embossed on the electrode covers. [TN: This passage appears twice.] In FIG. 11a, reference numeral 87 is used to show that a very fine distribution of the media is possible via other connection channels by means of seals or corresponding sheet metal sheets.

FIGS. 12 b-e show different variations of how the elasticity in the inner stack can be produced in a defined manner until a pretensioning is reached as a result of the inner stack acting as a compression spring.

FIG. 12f shows a sectional view of the compensation and distribution groove 156, which is required when the spacers 79 are molded as longitudinal bulges. Gas can then move freely between the individual channel regions.

FIG. 12g shows a cooling and media module design with electrode covers made of honeycomb sheet metal 165. Compensation and distribution grooves 165 are also required in this case. The cooling channel sheet is identified with 160, a supporting sheet is identified with 161, the pressure compensation opening is identified with 162 and the bending line of the supporting sheet is identified with 163.

FIG. 12h shows the electrode cover 165 from the gas channel side and how the gas flows into the electrode through the gas inlets. The electrode cover 165 penetrates into the electrode 5, 6 owing to the pressure in the stack axis and leaves a groove vacant in the "valley bottom", which is required for draining the residual gases and reaction products (refer also to the gas outlet grooves).

FIG. 12i shows the electrode cover 165 from the electrode side. It shows the gas and the backflowing residual gas and reaction products.

FIG. 13 shows a simplified sectional view of a fuel cell module 1. It shows the cell stack 2 with the end plates 13, 14, where the parallel cell interconnection 112 is shown by way of example. Owing to the process tolerances of the involved components, in particular the membrane electrode assembly 10 and the different thermal expansions, the desired ideal stack axis or stack orientation 111 cannot be assembled in the inner stack 109 in all cases. The outer stack is identified with 110. An attempt is made to recover the offset resulting from mechanical tensioning owing to the above mentioned problems. The consequences are squashed edges, leakages, gas diffusion and spontaneous, uncontrollable side reactions of the process gases, which is not the case with the embodiment of the fuel cell module 1 according to the invention. Reference numeral 112 identifies the parallel cell interconnection, 115 the power poles.

FIG. 13 shows that operation that should take place with two cooling circuits 116, 117, for the oxygen side and for the hydrogen side, respectively. The flow direction in the cooling channel is changed for each subsequent cooling and medium module 40. The counter flow cooling circuits 116, 117 are preferably conveyed via a heat exchanger 120 before being introduced into the circuit via the storage container 128 and the preparation as well as via the compressor 118. Conversely, the coolant is introduced in the other circuit via the heat exchanger 120, a storage container 123 and via the compressor 119, the waste heat 121 being discharged from the heat exchanger 120. The process heat 120, which was extracted from the fuel cell or the fuel cell module 1 and transported to the heat exchanger 120 via the coolant, is specifically used and discharged if necessary. The heat can also be used, e.g. to preheat the process gas or, in case of stationary installations, to extract useful heat for heating. Besides, the return of closed systems has a storage container 122, 123 with optional media preparation after the heat exchanger 120.

FIG. 13*b* shows the arrangement of a stack 125 consisting of several partial stacks 124. In this case, the cells are also connected in series and furnished with two counter flow cooling circuits 116, 117. The operation of the individual partial stacks 124 with own cooling circuit and own power poles, control and regulation is overall advantageous for the operation of the fuel cell module. Heating up an individual partial stack 124 requires considerably less external energy, e.g. from a battery, than heating up an entire stack 125. The partial stack can be started once the operating temperature for the partial stack 124 has been reached. The energy of the partial stack is used in first instance to bring the remaining cold partial stacks to the starting temperature. The individual partial stack is thus used as starting partial stack, which is associated with significant advantages. A partial stack 124 can furthermore also be used as a redundant emergency power system, e.g. to maintain the control and regulation functions or to provide rest energy.

The individual partial stacks 124, 125 are preferably connected in parallel and furnished with two counter flow cooling circuits; the cooling circuits of the individual stack and of the partial stack 125 are separated by several partial stacks 124 as long as the starting stack is heated up. The media flows are subsequently coupled. The same applies to the electrical interconnection.

Only a small battery capacity is required for the start. The small unit then provides the energy to bring the remaining stack to the operating temperature.

In the variation shown in FIG. 14, it is important that each of the transverse and distribution channels 92', 127', 128, 128' are included in individual structure sheets, while the seals 83, 84, 85 only have openings for the longitudinal channels. It shows the channels 91 for the distribution of the coolant 82. A cooling channel sheet and part of the distribution channels 128, 128', included by way of example in the cooling channel sheet, are visible behind them.

FIG. 14*a* is an enlarged view that shows in detail how the coolant flows out from the longitudinal channel or supply channel 92 via the connection channel 126 and transverse channel 127 as well as via the distribution channels 128. This applies similarly to the inlet and outlet of the coolant.

FIG. 14*b* shows a detail of the cooling channel. Both cooling channel sheets are furnished with connection channels 126, transverse channels 127, and distribution channels 128. An advantage is that the inner resistances can thus be reduced. It shows channels which are made similar to a through hole (open) and other channels which are not open (closed) and are included in the sheet metal sheet without opening it completely.

FIG. 15 shows a view of the membrane electrode side of the electrode cover 71 with the gas inlets 73. The gas flowing out of the gas inlets 73, 73' and the gas flowing into the gas outlet grove 74 are clearly visible. The channels for the distribution of the gases are identified with 127, 128. It can also be seen that a multitude of the above-mentioned gas inlets 73 is provided distributed over the electrode cover, so that a very uniform distribution is possible. A cooling channel sheet and part of the distribution channels 128, 128' included in the cooling channel sheet are visible behind them.

FIG. 15*a* shows that connection channels 126, transverse channels 127, distribution channels 128, and gas outlet grooves 74 are preferably included in both electrode covers 72 (oxygen and hydrogen side). These channels are drawn here as open channels 126, 127, while reference numeral 128 is shown as a closed channel. FIG. 15*b* shows the closed channel structure 129. All channels 126", 127" and grooves 128 are closed; only the supply channel 92 is open. FIGS. 15*c* and *d* show the additional gas distributions 157, 157' on the electrode side of the electrode cover, which are used for fine gas distribution.

FIG. 16 shows a view of an end plate 13 or 14 in the stack axis 111 of a fuel cell module 1. What is important here is the vertical arrangement of the transverse channels 133 for the coolant. Reference numerals 130, 131 identify the conductive lugs, and the cross section of the stack is identified with 132. The inner stack is identified with 109 and the outer stack with 110.

The coolant flows from the supply channel 139 into the transverse channel 133 and from there into the system via the connection channel 138, while the transverse channels 134, 135 identify the inlet of the process gas and the outlet of the process gas, which are connected via the connection channel 136 and the distribution channels 137. The supply channel and disposal channel for process gas are identified with 140 and 140' and the gas outlet grooves are identified with 141. FIG. 16*a* and FIG. 16*b* show a lateral view and a top view of a partial area of the fuel cell module 1, while FIG. 16*c* x1 shows the cross sectional view of the oxygen inlet. The channels and inlets are open slots or bores, wherein the hydrogen inlet is appropriate designed, but is provided with separate supply channels 140. It is clear from the cross sectional view that the hydrogen transverse channel 134 is not connected to the longitudinal channel for oxygen (O2).

FIG. 16*f* shows an electrode cover 72 with a bearing lug 131.

FIG. 16*d* x2 provides a cross sectional view of the oxygen outlet, wherein the gas outlet groove 141 is shown as a groove included in the sheet metal sheet. The channels and inlets are open slots or bores. The hydrogen inlet is similarly designed. It can also be seen herein that the hydrogen transverse channel is not connected to the longitudinal channel for oxygen. The reference numerals 142, 142' identify the connection opening through the electrode cover 72. Reference numeral 143 identifies the outlet channel and reference numeral 144 identifies a partial flow related to the disposal channel 140' for the process gas, the oxygen in this case.

FIG. 16*e* x3 is a cross sectional view of the inlet for the coolant. The channels and inlets are again open slots or bores. The cross sectional view shows that two transverse channels 133, 133' flow into the cooling channel 138. The drainage is similarly designed, but in a mirror-inverted manner.

FIG. 16*g* shows another variant of the cross sectional view 16*d* x2: Protecting sheets 176 are inserted into the cell frame between the electrode cover 74 and the MEA seal 84, mainly in order to keep flowing gas away from the MEA seal 84 if the design requires an opening or channel in the electrode cover at this point. FIGS. 17 to 17*c* show a top view of the supply of the single cells with coolant as well as with hydrogen and oxygen.

FIGS. 17 through 17*c* show a plan view of the supply of coolant as well as hydrogen and oxygen for the individual cells.

FIG. 17 shows the cooling circuit 116 and FIG. 17*a* shows the cooling circuit 117, wherein it is clear that they are guided against each other. The medium inlet for the coolant is identified with reference numeral 30 and the outlet is identified with reference numeral 33. The illustrations according to FIGS. 17*b* and 17*c* are similar in that the conveyance or medium inlet 32 for hydrogen and the outlet on the oxygen side are identified with reference numeral 35.

FIG. 17*c* is a medium inlet for oxygen identified with 31 and the outlet, is identified with 34. These are good illustrations of how a uniform distribution is possible over the surface of the inner stack 109 with this embodiment.

FIG. 18 shows different variations of the interconnection of the conductive lugs. According to A, e.g. adjacent conductive lugs of a potential, e.g. (+) are held together with a connector. In B, the conductive lugs are bent together and welded, glued, clamped, etc. In C they are bent together and welded.

FIG. 19 shows a fuel cell module 12 with a cooling air supply (compressor) and the outlet of the heated cooling air to the environment.

All the features that have been mentioned, including those, solely disclosed in the drawings, are considered to be essential to the invention, both alone and in combination.

The invention claimed is:

1. An apparatus for a fuel cell module, the fuel cell module comprising:
    a plurality of single cells each having a membrane electrode assembly;
    a plurality of cooling and media modules, wherein each cooling and medial module separates the single cells;
    the cooling and media module having a cooling passageway sandwiched between gas distribution channels containing either oxygen or hydrogen, wherein both gas distribution channels that sandwich the cooling passageway contain only oxygen or hydrogen for each cooling and media module;
    the membrane electrode assembly of each single cell having an electrode anode and electrode cathode made of porous gas-permeable material, wherein the anode and cathode are separated by an anode and cathode catalyst, and wherein the anode and cathode catalyst are separated by an electrolyte membrane arranged between the catalysts;
    current collectors on the anode and cathode side;
    wherein media inlets and media outlets are allocated to the cooling and media modules; and
    wherein either the electrode anodes or electrode cathodes of adjacent membrane electrode assemblies sandwich both sides of each cooling and media module.

2. The fuel cell module according to claim 1, wherein the cooling and media module (40) is configured with cooling channels (42) and inlet channels (65) for gas consisting of an elastic structure of two or more components (60, 60").

3. A fuel cell module according to claim 1, wherein an inner stack (109) of a cell stack (1) further comprises a structure allowing breathing in the stack axis (111).

4. A fuel cell module according to claim 1, wherein the cooling and media module (40) further comprises cooling channels (63) and gas channels (42, 43, 44) made of sheet metal sheet, foil, or cold-rolled stainless steel, or of plastic film.

5. A fuel cell module according to claim 1, wherein the cooling and media module (40) further comprises cooling channels (63) and gas channels (65) made of plastic or plastic film.

6. The fuel cell module according to claim 2, wherein pressure in the cooling channels (42) and in gas channels (43, 44) for hydrogen and oxygen can be modified and correspondingly adjusted to the desired surface pressure at the membrane electrode assembly (10).

7. A fuel cell module according to claim 2, wherein electrode covers (72, 72') and components (90, 90') of the cooling channel (42) are separated by spacers (79).

8. A fuel cell module according to claim 2, wherein the inlet channels (65) for gas are configured with a partial inlet (66, 66') and supply a gas distribution zone (67) or a partial gas distribution zone (68).

9. A fuel cell module according to claim 1, wherein electrode covers (72, 72') of the cooling and media module (40) has gas inlets (73) for hydrogen or oxygen and outlets (74) for residual hydrogen, residual oxygen, and reaction products on the side facing toward the electrode anode and cathode (5, 6).

10. The fuel cell module according to claim 9, wherein pressure in the outlets (74) configured as through grooves is adjusted to be lower than in the gas channels (43, 44).

11. A fuel cell module according to claim 1, wherein single cells (7i, 7i+1, 7i+2) are configured and arranged as a stacked fan (56).

12. A fuel cell module according to claim 1, wherein single cells (7i, 7i+1, 7i+2) are configured layered and arranged as a parallel fan (57).

13. A fuel cell module according to claim 1, wherein the cell stack (1) consists of an outer pack of component rings and sealing rings (83, 84, 84) or of a cell frame (50) used as an outer stack (110) as well as an inner stack (109) consisting of the membrane electrode assembly (10) and of the cooling and media module (40).

14. A fuel cell module according to claim 1, wherein the length of the inner stack (109) has a defined dimension relative to the length of the outer stack (110).

15. A fuel cell module according to claim 1, wherein a cell stack (1) has cooling channel sheets (90, 91) of the same length and width, wherein the sheets (90, 91) limit individual functional chambers (42, 43, 44) with the seals (83, 84, 85) between them, and the cell frame (50) formed by them is provided with supply channels (92, 92', 139, 140, 140'), from which transverse channels (93, 133, 133', 134, 135), connection channels (136, 138), distribution channels (134), connection openings (142, 142') and outlet channels (143), which originate as a connection to the functional chambers (41, 42).

16. The fuel cell module according to claim 15, wherein supply channels (92) for hydrogen, oxygen, and coolant as well as disposal channels (92') for reaction products and excess gases allocated to the cell frame (50) are provided with a parallel and perpendicularly configuration.

17. A fuel cell module according to claim 1, wherein cooling flow is conveyed in the opposite direction from single cell (7) to single cell (7i+1, 7i+2) and is supplied by two uncoupled cooling systems.

18. A fuel cell module according to claim 1, wherein that each single cell (7i, 7i+1, 7i+2) has a live layer (45, 45'), which is respectively guided outward through an outer wall (48) of a cell stack (1) and is provided and interconnected with a connector (80).

19. A fuel cell module according to claim 1, wherein a surface (36) of the electrode anode and cathode (5, 6) is provided with an electrically feeding layer (45, 45', 105, 105', 106, 107).

20. A fuel cell module according to claim 19, wherein a current feeding layer (107, 107') is arranged on a plane of a reaction zones (R1, R2) and of the anode and cathode catalyst (3, 4).

21. A fuel cell module according to claim 19, wherein a current feeding layer (106, 106') is arranged on the plane between the electrode anode and cathode (5, 6) and the cooling and media module (40).

22. A fuel cell module according to claim 1, wherein the electrode anode and cathode (5, 6) is provided with a non-conductive but heat conductive configuration, and is porous regarding gas diffusion and convection, and is chemically and thermally stable.

23. A fuel cell module according to claim 1, wherein cell stack or stacks (1) is/are located in a ventilated stack housing (100) having interfaces (104) for the media supply and disposal and for the ventilation (101, 102) of the stack housing (100) as well as for voltage and pressure monitoring.

24. A fuel cell module according to claim 1, wherein the cell stack (1) has single cells (7) connected in parallel.

25. A fuel cell module according to claim 1, wherein the cell stack (1) is composed of partial stacks (124, 125), of which the partial stack (124) is configured and interconnected as start stack for the other partial stacks (125) and is connected to a heat exchanger (120).

26. A fuel cell module according to claim 25, wherein a partial stacks (124, 125) are connected in parallel, wherein their single cells (7) are respectively connected in series.

27. A fuel cell module according to claim 1, wherein electrode covers (72, 72', 158) are provided with conductive lugs (130, 131), which are used for current conduction from a reaction chambers to the outer side (48) of the cell stack (1) via the electrodes (5, 6) and the electrode covers (72), and are there connected to each other, namely by welding the conductive lugs, or clamping or interconnecting with connectors.

* * * * *